(12) United States Patent
Nam et al.

(10) Patent No.: US 10,917,523 B2
(45) Date of Patent: Feb. 9, 2021

(54) CODEBOOK DESIGN AND STRUCTURE FOR ADVANCED WIRELESS COMMUNICATION SYSTEMS

(71) Applicant: Samsung Electronics Co., Ltd., Suwon-si (KR)

(72) Inventors: Young-Han Nam, Plano, TX (US); Yang Li, Plano, TX (US); Eko Onggosanusi, Allen, TX (US); Md. Saifur Rahman, Richardson, TX (US); Taeyoung Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/818,331

(22) Filed: Nov. 20, 2017

(65) Prior Publication Data

US 2018/0077284 A1 Mar. 15, 2018
US 2020/0336591 A9 Oct. 22, 2020

Related U.S. Application Data

(63) Continuation of application No. 14/875,252, filed on Oct. 5, 2015, now Pat. No. 9,825,742.
(Continued)

(51) Int. Cl.
*H04M 3/51* (2006.01)
*H04B 7/0456* (2017.01)
(Continued)

(52) U.S. Cl.
CPC ........ *H04M 3/5125* (2013.01); *H04B 7/0478* (2013.01); *H04B 7/0639* (2013.01);
(Continued)

(58) Field of Classification Search
USPC ........ 375/267, 219, 260, 298; 370/203, 252
See application file for complete search history.

(56) References Cited

U.S. PATENT DOCUMENTS 5,157,743 A * 10/1992 Maeda ................ H04N 19/154
348/403.1
8,391,392 B2 3/2013 Melzer et al.
(Continued)

OTHER PUBLICATIONS

Foreign Communication From a Related Counterpart Application, PCT Application No. PCT/KR2015/011516, International Search Report dated Feb. 19, 2016, 3 pages.
(Continued)

*Primary Examiner* — Amal S Zenati

(57) ABSTRACT

A base station capable of communicating with a user equipment (UE) includes a transceiver configured to transmit Channel State Information-Reference Signal (CSI-RS) according to a CSI-RS configuration comprising a number of antenna ports, and downlink signals containing the CSI-RS configuration and a precoding-matrix-construction configuration for precoding matrix indicator (PMI) reporting on physical downlink shared channels (PDSCH), the precoding-matrix-construction configuration comprising a first and second sampling factors, $O_1$ and $O_2$, and a first and second numbers, $N_1$ and $N_2$, receive, from the UE, uplink signals containing a precoding matrix indicator (PMI) derived using the CSI-RS according to the precoding-matrix-construction configuration, a controller configured to convert the PMI to one of predetermined precoding matrices.

24 Claims, 12 Drawing Sheets

Related U.S. Application Data

(60) Provisional application No. 62/059,664, filed on Oct. 3, 2014, provisional application No. 62/073,782, filed on Oct. 31, 2014, provisional application No. 62/080,832, filed on Nov. 17, 2014, provisional application No. 62/085,038, filed on Nov. 26, 2014, provisional application No. 62/085,057, filed on Nov. 26, 2014, provisional application No. 62/095,507, filed on Dec. 22, 2014, provisional application No. 62/108,337, filed on Jan. 27, 2015, provisional application No. 62/111,475, filed on Feb. 3, 2015, provisional application No. 62/113,612, filed on Feb. 9, 2015, provisional application No. 62/127,142, filed on Mar. 2, 2015, provisional application No. 62/128,196, filed on Mar. 4, 2015.

(51) Int. Cl.
| | |
|---|---|
| *H04W 48/00* | (2009.01) |
| *H04W 88/02* | (2009.01) |
| *H04L 5/00* | (2006.01) |
| *H04B 7/06* | (2006.01) |
| *H04L 1/00* | (2006.01) |
| *H04W 24/00* | (2009.01) |
| *H04L 29/06* | (2006.01) |
| *H04W 88/08* | (2009.01) |

(52) U.S. Cl.
CPC .............. *H04L 1/00* (2013.01); *H04L 5/0023* (2013.01); *H04L 5/0048* (2013.01); *H04L 65/105* (2013.01); *H04L 65/1006* (2013.01); *H04L 65/1073* (2013.01); *H04L 65/80* (2013.01); *H04M 3/5175* (2013.01); *H04M 3/5191* (2013.01); *H04W 24/00* (2013.01); *H04W 48/00* (2013.01); *H04M 2203/402* (2013.01); *H04W 88/02* (2013.01); *H04W 88/08* (2013.01)

(56) References Cited

U.S. PATENT DOCUMENTS

| | | | |
|---|---|---|---|
| 2011/0205930 A1* | 8/2011 | Rahman | H04B 7/0417 370/252 |
| 2013/0064318 A1 | 3/2013 | Liu et al. | |
| 2013/0308715 A1* | 11/2013 | Nam | H04B 7/0469 375/267 |
| 2014/0016549 A1* | 1/2014 | Novlan | H04B 7/0417 370/328 |
| 2014/0098689 A1 | 4/2014 | Lee et al. | |
| 2014/0177744 A1 | 6/2014 | Krishnamurthy et al. | |
| 2014/0177745 A1* | 6/2014 | Krishnannurthy | H04B 7/0413 375/267 |
| 2014/0226702 A1 | 8/2014 | Onggosanusi et al. | |
| 2014/0301492 A1 | 10/2014 | Xin et al. | |
| 2015/0146618 A1* | 5/2015 | Ko | H04B 7/0456 370/328 |
| 2016/0149630 A1* | 5/2016 | Liu | H04B 7/0417 370/329 |
| 2016/0173244 A1 | 6/2016 | Ding | |
| 2017/0041113 A1 | 2/2017 | Park | |

OTHER PUBLICATIONS

Foreign Communication From a Related Counterpart Application, PCT Application No. PCT/KR2015/011516, Written Opinion dated Feb. 19, 2016, 8 pages.
Office Action dated May 26, 2020 in connection with India Patent Application No. 201717018811, 6 pages.

* cited by examiner

CODEBOOK DESIGN AND STRUCTURE FOR ADVANCED WIRELESS COMMUNICATION SYSTEMS

CROSS-REFERENCE TO RELATED APPLICATION AND CLAIMS OF PRIORITY

This application is a continuation of U.S. Non-Provisional patent application Ser. No. 14/874,252 filed Oct. 2, 2015 and entitled CODEBOOK DESIGN AND STRUCTURE FOR ADVANCED WIRELESS COMMUNICATION SYSTEMS, now U.S. Pat. No. 9,825,742, which claims priority to: U.S. Provisional Patent Application No. 62/059,664 filed Oct. 3, 2014; U.S. Provisional Patent Application No. 62/073,782 filed Oct. 31, 2014; U.S. Provisional Patent Application No. 62/080,832 filed Nov. 17, 2014; U.S. Provisional Patent Application No. 62/085,038 filed Nov. 26, 2014; U.S. Provisional Patent Application No. 62/085,057 filed Nov. 26, 2014; U.S. Provisional Patent Application No. 62/095,507 filed Dec. 22, 2014; U.S. Provisional Patent Application No. 62/108,337 filed Jan. 27, 2015; U.S. Provisional Patent Application No. 62/111,475 filed Feb. 3, 2015; U.S. Provisional Patent Application No. 62/113,612 filed Feb. 9, 2015; U.S. Provisional Patent Application No. 62/127,142 filed Mar. 2, 2015, and U.S. Provisional Patent Application No. 62/128,196 filed Mar. 4, 2015. The above-identified patent documents are hereby incorporated by reference in their entirety.

TECHNICAL FIELD

The present disclosure relates generally to a codebook design and structure associated with a two dimensional transmit antennas array. Such two dimensional arrays are associated with a type of multiple-input-multiple-output (MIMO) system often termed "full-dimension" MIMO (FD-MIMO).

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

SUMMARY

In a first embodiment, a base station capable of communicating with a user equipment (UE) provided. The base station includes a transceiver configured to transmit Channel State Information-Reference Signal (CSI-RS) according to a CSI-RS configuration comprising a plurality of antenna ports, and downlink signals containing the CSI-RS configuration and a precoding-matrix-construction configuration for precoding matrix indicator (PMI) reporting on physical downlink shared channels (PDSCH), the precoding-matrix-construction configuration comprising a first and second oversampling factors, $O_1$ and $O_2$, and a first and second numbers, $N_1$ and $N_2$, receive, from the UE, uplink signals containing a plurality of precoding matrix indicators (PMIs) derived using the CSI-RS according to the precoding-matrix-construction configuration, a controller configured to convert the number of PMIs to one of predetermined precoding matrices having a form of $$\begin{bmatrix} h \otimes v \\ e^{j\varphi} h \otimes v \end{bmatrix},$$

wherein $\varphi$ is a co-phasing factor, and h and v are vectors of size $N_1 \times 1$ and $N_2 \times 1$, respectively.

In some embodiments, $N_1 = 4$ and $N_2 = 2$, h and v are $$h = [1\ e^{j2\pi m_1/D_1}\ e^{j4\pi m_1/D_1}\ e^{j6\pi m_1/D_1}]^t,$$

$$v = [1\ e^{j2\pi m_2/D_2}]^t,$$

where $D_1 = O_1 \cdot N_1$, $D_2 = O_2 \cdot N_2$, and $m_1$ and $m_2$ are each a positive integer.

In a second embodiment, a method for a base station (BS) is provided. The method includes transmitting Channel State Information-Reference Signal (CSI-RS) according to a CSI-RS configuration comprising a plurality of antenna ports, and downlink signals containing the CSI-RS configuration and a precoding-matrix-construction configuration for precoding matrix indicator (PMI) reporting on physical downlink shared channels (PDSCH), the precoding-matrix-construction configuration comprising a first and second oversampling factors, $O_1$ and $O_2$, and a first and second numbers, $N_1$ and $N_2$, receiving, from the UE, uplink signals containing a plurality of precoding matrix indicators (PMIs) derived using the CSI-RS according to the precoding-matrix-construction configuration, converting the number of PMIs to one of predetermined precoding matrices having a form of $$\begin{bmatrix} h \otimes v \\ e^{j\varphi} h \otimes v \end{bmatrix},$$

wherein $\varphi$ is a co-phasing factor, and h and v are vectors of size $N_1 \times 1$ and $N_2 \times 1$, respectively.

In a third embodiment, a User Equipment (UE) capable of communicating with a base station (BS) is provided. The UE includes a transceiver configured to receive Channel State Information-Reference Signal (CSI-RS) according to a CSI-RS configuration comprising a plurality of antenna ports, and downlink signals containing the CSI-RS configuration and a precoding-matrix-construction configuration for precoding matrix indicator (PMI) reporting on physical downlink shared channels (PDSCH), the precoding-matrix-construction configuration comprising a first and second oversampling factors, $O_1$ and $O_2$, and a first and second numbers, $N_1$ and $N_2$, a controller configured to demodulate and decode the downlink signals to obtain higher-layer configured values for the $O_1$ and $O_2$, and the $N_1$ and $N_2$, determine a plurality of precoding matrix indicators (PMIs) derived using the CSI-RS according to the precoding-matrix-construction configuration, and cause the transceiver to transmit, to the BS, uplink signals containing the plurality of PMI, wherein the plurality of PMIs correspond to one of a plurality of predetermined precoding matrices having a form of $$\begin{bmatrix} h \otimes v \\ e^{j\varphi} h \otimes v \end{bmatrix},$$

where φ is a co-phasing factor, and h and v are vectors of size $N_1 \times 1$ and $N_2 \times 1$, respectively.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated into the present disclosure as if fully set forth herein: (1) 3rd Generation Partnership Project (3GPP) TS 36.211, "E-UTRA, Physical channels and modulation," Release-12; (2) 3GPP TS 36.212, "E-UTRA, Multiplexing and channel coding," Release-12; and (3) 3GPP TS 36.213, "E-UTRA, Physical layer procedures," Release-12.

Figure 1:
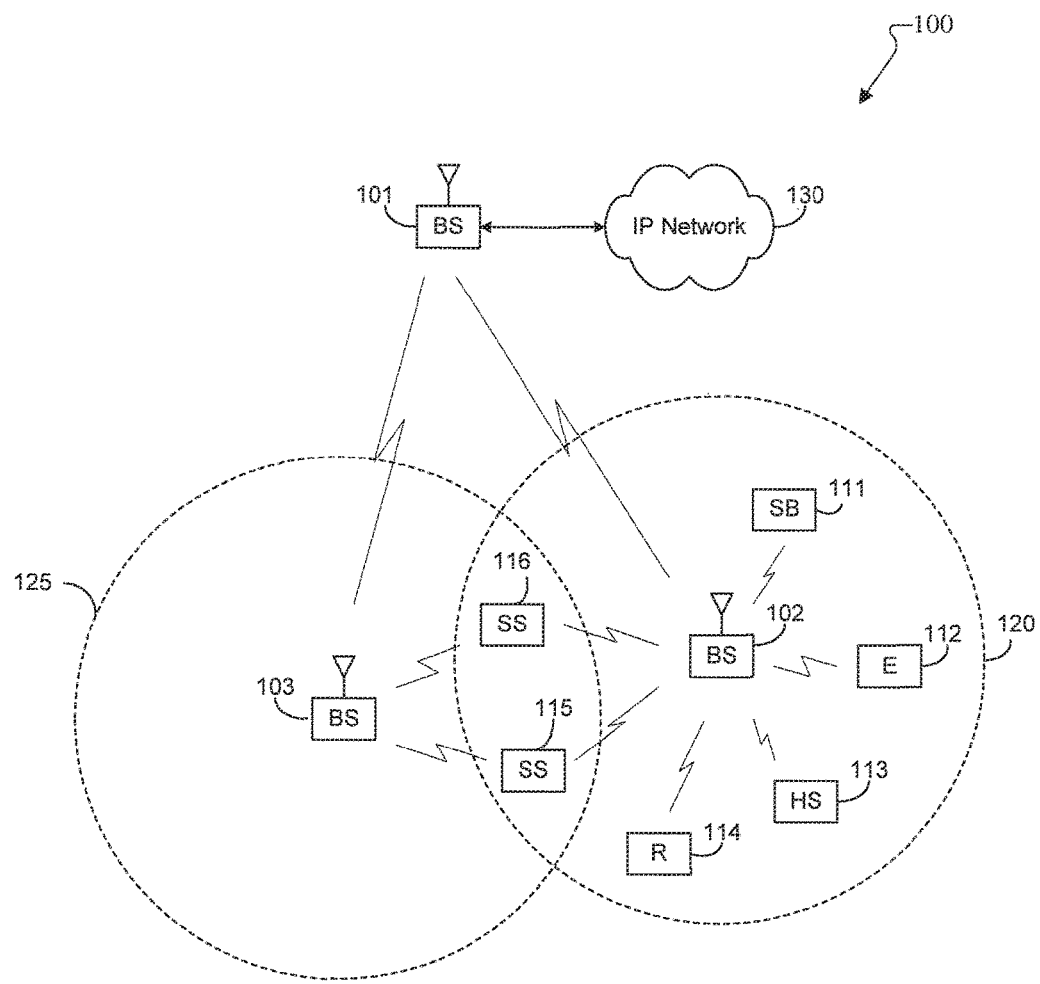
FIG. 1 illustrates an example wireless network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

The wireless network 100 includes an eNodeB (eNB) 101, an eNB 102, and an eNB 103, alternatively referred to as a base station (BS). The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" (as previously noted) or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, long-term evolution (LTE), LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of BS 101, BS 102 and BS 103 include 2D antenna arrays as described in embodiments of the present disclosure. In some embodiments, one or more of BS 101, BS 102 and BS 103 support the codebook design and structure for systems having 2D antenna arrays.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
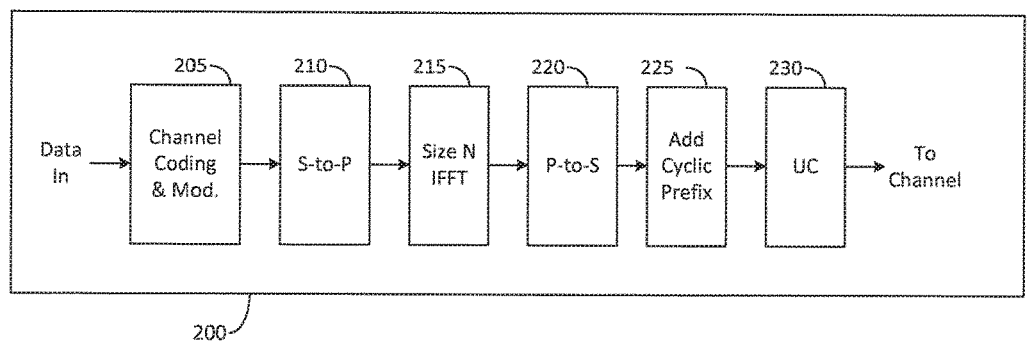
FIGS. 2A and 2B illustrate example wireless transmit and receive paths according to this disclosure.
Figure 2B:
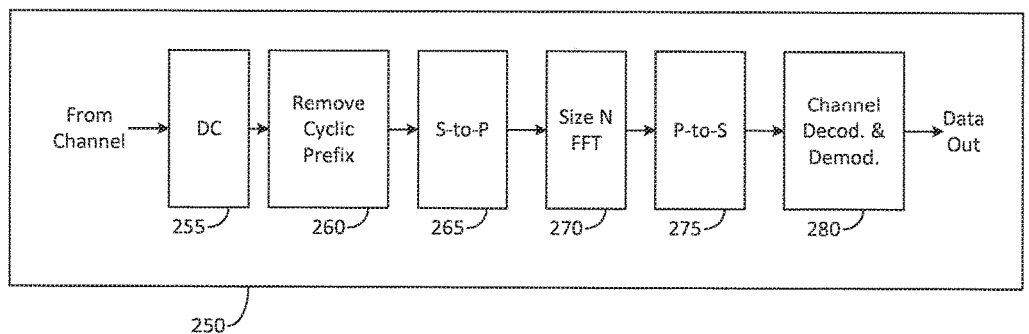

FIGS. 2A and 2B illustrate example wireless transmit and receive paths according to this disclosure. In the following description, a transmit path 200 may be described as being implemented in an eNB (such as eNB 102), while a receive path 250 may be described as being implemented in a UE (such as UE 116). However, it will be understood that the receive path 250 could be implemented in an eNB and that the transmit path 200 could be implemented in a UE. In some embodiments, the receive path 250 is configured to support the codebook design and structure for systems having 2D antenna arrays as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to eNBs 101-103 and may implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architectures could be used to support wireless communications in a wireless network.

Figure 3A:
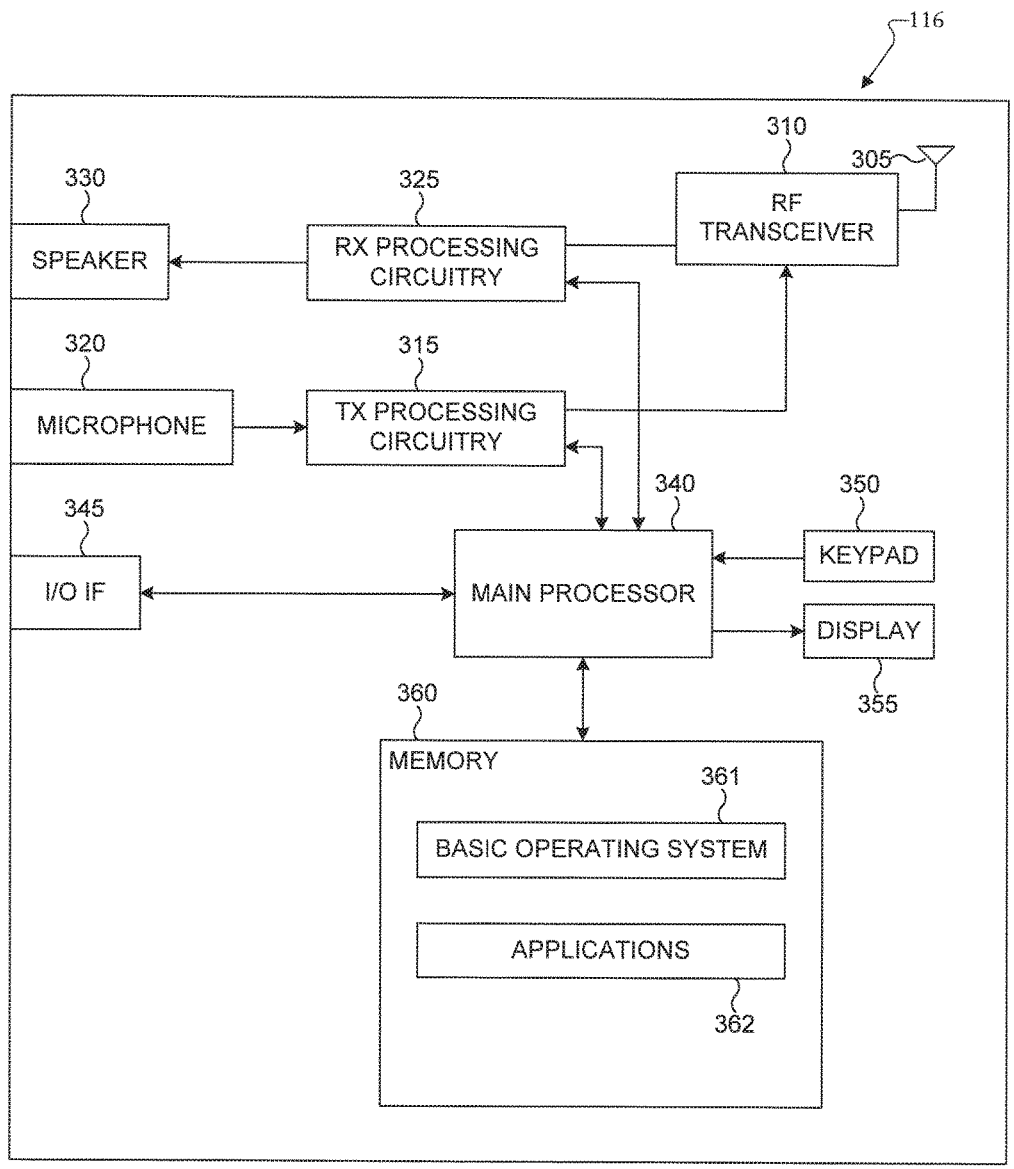
FIG. 3A illustrates an example user equipment according to this disclosure.

FIG. 3A illustrates an example UE 116 according to this disclosure. The embodiment of the UE 116 illustrated in FIG. 3A is for illustration only, and the UEs 111-115 of FIG. 1 could have the same or similar configuration. However, UEs come in a wide variety of configurations, and FIG. 3A does not limit the scope of this disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an eNB of the wireless network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for channel quality measurement and reporting for systems having 2D antenna arrays as described in embodiments of the present disclosure as described in embodiments of the present disclosure. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main controller or processor 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

Although FIG. 3A illustrates one example of UE 116, various changes may be made to FIG. 3A. For example, various components in FIG. 3A could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3A illustrates the UE 116 configured as a mobile telephone or smartphone, UEs could be configured to operate as other types of mobile or stationary devices.

Figure 3B:
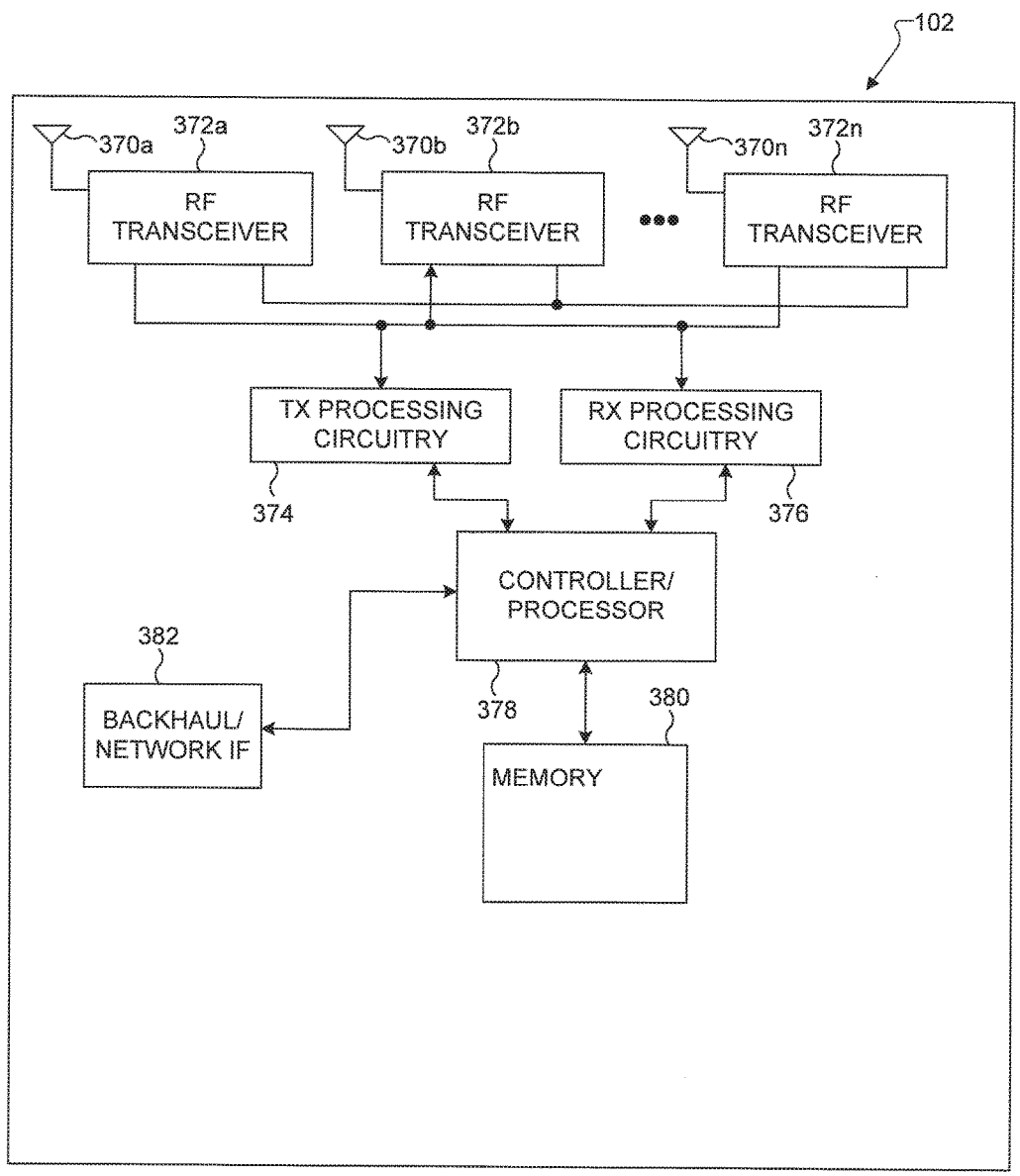
FIG. 3B illustrates an example enhanced NodeB (eNB) according to this disclosure.

FIG. 3B illustrates an example eNB 102 according to this disclosure. The embodiment of the eNB 102 shown in FIG. 3B is for illustration only, and other eNBs of FIG. 1 could have the same or similar configuration. However, eNBs come in a wide variety of configurations, and FIG. 3B does not limit the scope of this disclosure to any particular implementation of an eNB. It is noted that eNB 101 and eNB 103 can include the same or similar structure as eNB 102.

As shown in FIG. 3B, the eNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The eNB 102 also includes a controller/processor 378, a memory 380, and a backhaul or network interface 382.

The RF transceivers 372a-372n receive, from the antennas 370a-370n, incoming RF signals, such as signals transmitted by UEs or other eNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the eNB 102. For example, the controller/processor 378 could control the reception of forward channel signals and the transmission of reverse channel signals by the RF transceivers 372a-372n, the RX processing circuitry 376, and the TX processing circuitry 324 in accordance with well-known principles. The controller/processor 378 could support additional functions as well, such as more advanced wireless communication functions. For instance, the controller/processor 378 can perform the blind interference sensing (BIS) process, such as performed by a BIS algorithm, and decodes the received signal subtracted by the interfering signals. Any of a wide variety of other functions could be supported in the eNB 102 by the controller/processor 378. In some embodiments, the controller/processor 378 includes at least one microprocessor or microcontroller.

The controller/processor 378 is also capable of executing programs and other processes resident in the memory 380, such as a basic OS. The controller/processor 378 is also capable of supporting channel quality measurement and reporting for systems having 2D antenna arrays as described in embodiments of the present disclosure. In some embodiments, the controller/processor 378 supports communications between entities, such as web RTC. The controller/processor 378 can move data into or out of the memory 380 as required by an executing process.

The controller/processor 378 is also coupled to the backhaul or network interface 335. The backhaul or network interface 382 allows the eNB 102 to communicate with other devices or systems over a backhaul connection or over a network. The interface 382 could support communications over any suitable wired or wireless connection(s). For example, when the eNB 102 is implemented as part of a cellular communication system (such as one supporting 5G, LTE, or LTE-A), the interface 382 could allow the eNB 102 to communicate with other eNBs over a wired or wireless backhaul connection. When the eNB 102 is implemented as an access point, the interface 382 could allow the eNB 102 to communicate over a wired or wireless local area network or over a wired or wireless connection to a larger network (such as the Internet). The interface 382 includes any suitable structure supporting communications over a wired or wireless connection, such as an Ethernet or RF transceiver.

The memory 380 is coupled to the controller/processor 378. Part of the memory 380 could include a RAM, and another part of the memory 380 could include a Flash memory or other ROM. In certain embodiments, a plurality of instructions, such as a BIS algorithm is stored in memory. The plurality of instructions are configured to cause the controller/processor 378 to perform the BIS process and to decode a received signal after subtracting out at least one interfering signal determined by the BIS algorithm.

As described in more detail below, the transmit and receive paths of the eNB 102 (implemented using the RF transceivers 372a-372n, TX processing circuitry 374, and/or RX processing circuitry 376) support communication with aggregation of FDD cells and TDD cells.

Although FIG. 3B illustrates one example of an eNB 102, various changes may be made to FIG. 3B. For example, the eNB 102 could include any number of each component shown in FIG. 3. As a particular example, an access point could include a number of interfaces 382, and the controller/processor 378 could support routing functions to route data between different network addresses. As another particular example, while shown as including a single instance of TX processing circuitry 374 and a single instance of RX processing circuitry 376, the eNB 102 could include multiple instances of each (such as one per RF transceiver).

Figure 4A:
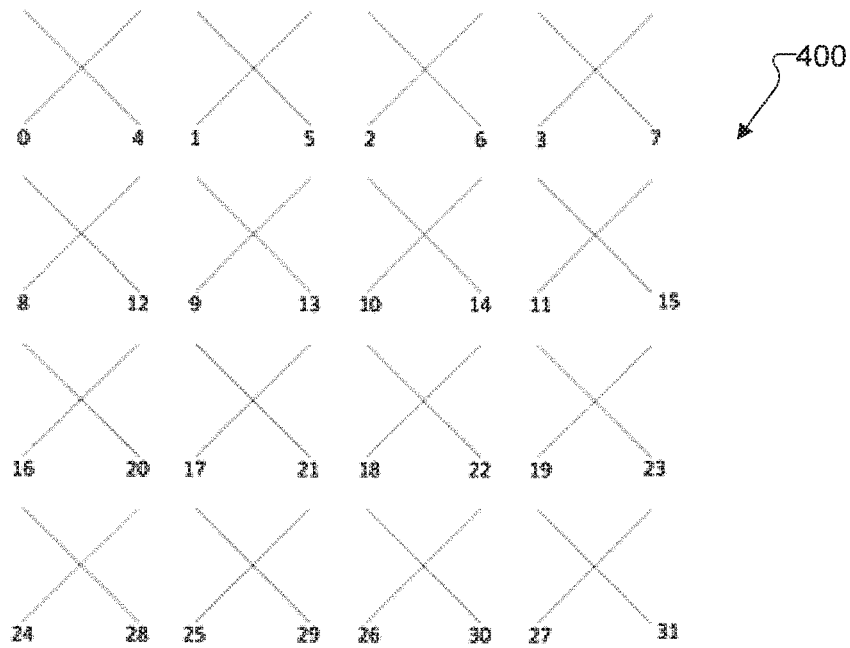
FIGS. 4A and 4B illustrate example 2D antenna arrays comprising 16 dual-polarized antenna elements according to this disclosure.
Figure 4B:
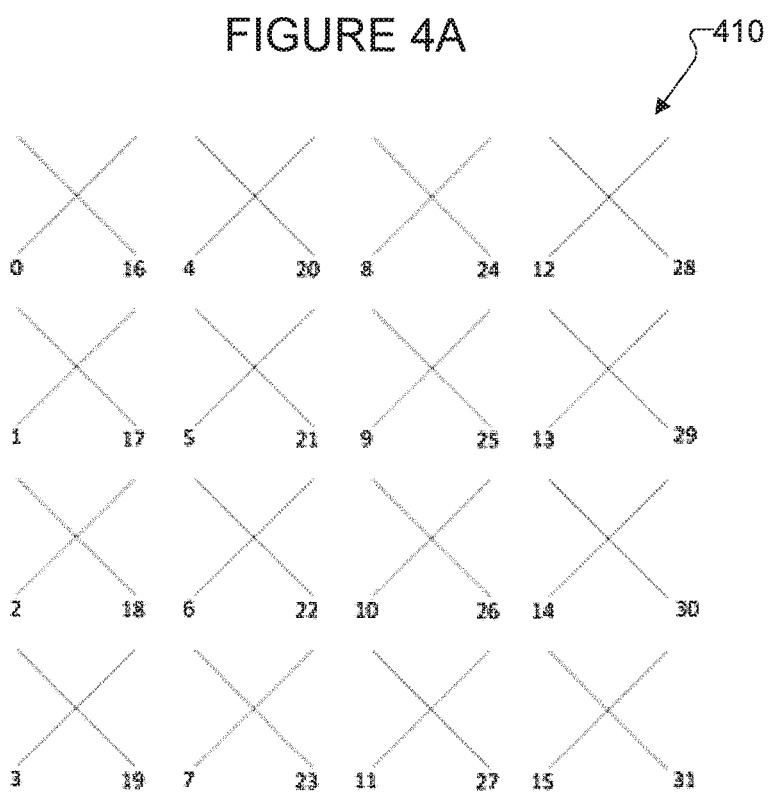

FIGS. 4A and 4B illustrate example 2D antenna arrays that are constructed from 16 dual-polarized antenna elements arranged in a 4×4 rectangular format according to embodiments of the present disclosure. FIG. 4A illustrates a 4×4 dual-polarized antenna array 400 with antenna port (AP) indexing 1, and FIG. 4B is the same 4×4 dual-polarized antenna array 410 with antenna port indexing (AP) indexing 2. The embodiment shown in FIGS. 4A and 4B are for illustration only. Other embodiments could be used without departing from the scope of the present disclosure.

In certain embodiments, each labelled antenna element is logically mapped onto a single antenna port. In general, one antenna port can correspond to multiple antenna elements (physical antennas) combined via a virtualization. This 4×4 dual polarized array can then be viewed as 16×2=32-element array of elements. The vertical dimension (consisting of 4 rows) facilitates elevation beamforming in addition to the azimuthal beamforming across the horizontal dimension (consisting of 4 columns of dual polarized antennas). MIMO precoding in Rel.12 LTE standardization (per TS36.211 sections 6.3.4.2 and 6.3.4.4; and TS36.213 section 7.2.4) was largely designed to offer a precoding gain for one-dimensional antenna array. While fixed beamforming (i.e. antenna virtualization) can be implemented across the elevation dimension, it is unable to reap the potential gain offered by the spatial and frequency selective nature of the channel.

Figure 5:
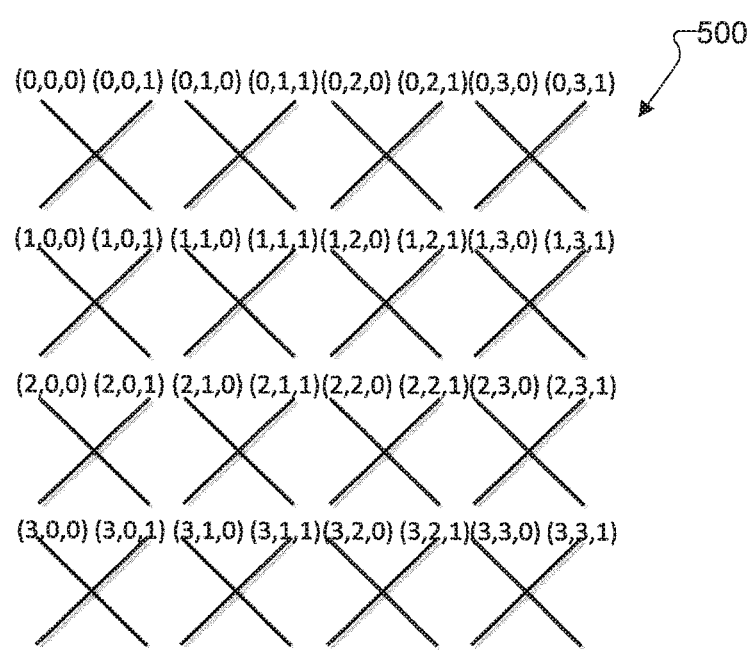
FIG. 5 illustrates another numbering of TX antenna elements according to this disclosure.

FIG. 5 illustrates another numbering of TX antenna elements 500 (or TXRU) according to embodiments of the present disclosure. The embodiment shown in FIG. 5 is for illustration only. Other embodiments could be used without departing from the scope of the present disclosure.

In certain embodiments, eNB is equipped with 2D rectangular antenna array (or TXRUs), comprising M rows and N columns with P=2 polarized, wherein each element (or TXRU) is indexed with (m, n, p), and m=0, . . . , M−1, n=0, . . . , N−1, p=0, . . . , P−1, as illustrated in FIG. 5 with M=N=4. When the example shown in FIG. 5 represents a TXRU array, a TXRU can be associated with multiple antenna elements. In one example (1-dimensional (1D) subarray partition), an antenna array comprising a column with a same polarization of a 2D rectangular array is partitioned into M groups of consecutive elements, and the M groups correspond to the M TXRUs in a column with a same polarization in the TXRU array in FIG. 5. In later embodiments, (M,N) is sometimes denoted as ($N_H$, $N_V$) or ($N_1$, $N_2$).

In some embodiments, a UE is configured with a CSI-RS resource comprising Q=MNP number of CSI-RS ports, wherein the CSI-RS resource is associated with MNP number of resource elements (REs) in a pair of PRBs in a subframe.

CSI-RS and CSI Feedback Configuration

In some embodiments, a UE is configured with a CSI-RS configuration via higher layer, configuring Q antenna ports—antenna ports A(1) through A(Q). The UE 116 is further configured with CSI reporting configuration via higher layer in association with the CSI-RS configuration. The CSI reporting configuration includes information element (IE) indicating the CSI-RS decomposition information (or component PMI port configuration).

One example method of indicating the PMI reporting decomposition is to explicitly configure M, N, and P, and implicitly configure Q as described below TABLE 1:

TABLE 1

| Component PMI port configuration | M . . . positive even number, e.g., selected from {1, 2, 4, . . . , 16} <br> N . . . positive even number, e.g., selected from {1, 2, 4, . . . , 16} <br> P . . . either 1 or 2 <br> Q = M · N · P . . . implicitly derived out of explicitly configured M, N, and P. |
|---|---|

In conventional LTE, MIMO precoding (for spatial multiplexing) can be performed either with CRS (cf. TS36.211 section 6.3.4.2) or UE-specific reference signal (UE-RS) (cf. TS36.211 section 6.3.4.4). In either case, each UE operating in spatial multiplexing mode(s) is configured to report CSI which can contain precoding matrix indicator (PMI) (i.e. precoding codebook index). PMI report is derived from one of the following sets of standardized codebooks: Two antenna ports: {TS36.211 table 6.3.4.2.3-1}; Four antenna ports: {TS36.211 table 6.3.4.2.3-2} or {TS36.213 table 7.2.4-0A, B, C, and D}; and Eight antenna ports: {TS36.213 table 7.2.4-1, 2, 3, 4, 5, 6, 7, and 8}

If the eNB follows the UE's PMI recommendation, the eNB is expected to precode its transmitted signal according to the recommended precoding vector/matrix (for a given subframe and physical resource block (PRB)). Regardless whether the eNB follows the UE's recommendation, the UE is configured to report a PMI according to the above precoding codebooks. Here a PMI (which can consist of a single index or a pair of indices) is associated with a precoding matrix W of size $N_c \times N_L$ where $N_c$ is the number of antenna ports in one row (=number of columns) and $N_L$ is the number of transmission layers.

Rel. 12 LTE 8-Tx Double Codebook

TABLE 2 and TABLE 3 are codebooks for rank-1 and rank-2 (1-layer and 2-layer) CSI reporting for UEs configured with 8 Tx antenna port transmissions. To determine a CW for each codebook, two indices, i.e., $i_1$ and $i_2$ have to be selected. In these precoder expressions, the following two variables are used:

$$\varphi_n = e^{j\pi n/2}$$

$$v_m = [1\ e^{j2\pi m/32}\ e^{j4\pi m/32}\ e^{j6\pi m/32}]^T.$$

TABLE 2

Codebook for 1-layer CSI reporting using antenna ports 15 to 22

| $i_1$ | $i_2$ | | | | | | | |
|---|---|---|---|---|---|---|---|---|
| | 0 | 1 | 2 | 3 | 4 | 5 | 6 | 7 |
| 0-15 | $W_{2i_1,0}^{(1)}$ | $W_{2i_1,1}^{(1)}$ | $W_{2i_1,2}^{(1)}$ | $W_{2i_1,3}^{(1)}$ | $W_{2i_1+1,0}^{(1)}$ | $W_{2i_1+1,1}^{(1)}$ | $W_{2i_1+1,2}^{(1)}$ | $W_{2i_1+1,3}^{(1)}$ |

| $i_1$ | $i_2$ | | | | | | | |
|---|---|---|---|---|---|---|---|---|
| | 8 | 9 | 10 | 11 | 12 | 13 | 14 | 15 |
| 0-15 | $W_{2i_1+2,0}^{(1)}$ | $W_{2i_1+2,1}^{(1)}$ | $W_{2i_1+2,2}^{(1)}$ | $W_{2i_1+2,3}^{(1)}$ | $W_{2i_1+3,0}^{(1)}$ | $W_{2i_1+3,1}^{(1)}$ | $W_{2i_1+3,2}^{(1)}$ | $W_{2i_1+3,3}^{(1)}$ | where $$W_{m,n}^{(1)} = \frac{1}{\sqrt{8}} \begin{bmatrix} v_m \\ \varphi_n v_m \end{bmatrix},$$

If the most recently reported RI=1, m and n are derived with the two indices $i_1$ and $i_2$ according to TABLE 2, resulting in a rank-1 precoder, $$W_{m,n}^{(1)} = \frac{1}{\sqrt{8}} \begin{bmatrix} v_m \\ \varphi_n v_m \end{bmatrix}.$$

TABLE 3

Codebook for 2-layer CSI reporting using antenna ports 15 to 22.

| $i_1$ | $i_2$ | | | |
|---|---|---|---|---|
| | 0 | 1 | 2 | 3 |
| 0-15 | $W_{2i_1,2i_1,0}^{(2)}$ | $W_{2i_1,2i_1,1}^{(2)}$ | $W_{2i_1+1,2i_1+1,0}^{(2)}$ | $W_{2i_1+1,2i_1+1,1}^{(2)}$ |

| $i_1$ | $i_2$ | | | |
|---|---|---|---|---|
| | 4 | 5 | 6 | 7 |
| 0-15 | $W_{2i_1+2,2i_1+2,0}^{(2)}$ | $W_{2i_1+2,2i_1+2,1}^{(2)}$ | $W_{2i_1+3,2i_1+3,0}^{(2)}$ | $W_{2i_1+3,2i_1+3,1}^{(2)}$ |

| $i_1$ | $i_2$ | | | |
|---|---|---|---|---|
| | 8 | 9 | 10 | 11 |
| 0-15 | $W_{2i_1,2i_1+1,0}^{(2)}$ | $W_{2i_1,2i_1+1,1}^{(2)}$ | $W_{2i_1+1,2i_1+2,0}^{(2)}$ | $W_{2i_1+1,2i_1+2,1}^{(2)}$ |

TABLE 3-continued

Codebook for 2-layer CSI reporting using antenna ports 15 to 22.

| | $i_2$ | | | |
|---|---|---|---|---|
| $i_1$ | 12 | 13 | 14 | 15 |
| 0-15 | $W_{2i_1,2i_1+3,0}^{(2)}$ | $W_{2i_1,2i_1+3,1}^{(2)}$ | $W_{2i_1+1,2i_1+3,0}^{(2)}$ | $W_{2i_1+1,2i_1+3,1}^{(2)}$ | where $$W_{m,m',n}^{(2)} = \frac{1}{4}\begin{bmatrix} v_m & v_{m'} \\ \varphi_n v_m & -\varphi_n v_{m'} \end{bmatrix}$$

If the most recently reported RI=2, m, m' and n are derived with the two indices $i_1$ and $i_2$ according to TABLE 3, resulting in a rank-2 precoder, $$W_{m,m',n}^{(2)} = \frac{1}{4}\begin{bmatrix} v_m & v_{m'} \\ \varphi_n v_m & -\varphi_n v_{m'} \end{bmatrix}$$

It is noted that $W_{m,m',n}^{(2)}$ is constructed such that it can be used for two different types of channel conditions that facilitate a rank-2 transmission.

One subset of the codebook associated with $i_2=\{0, 1, \ldots, 7\}$ comprises codewords with m=m', or the same beams ($v_m$) are used for constructing the rank-2 precoder:

$$W_{m,m,n}^{(2)} = \frac{1}{4}\begin{bmatrix} v_m & v_m \\ \varphi_n v_m & -\varphi_n v_m \end{bmatrix}.$$

In this case, the two columns in the 2-layer precoder are orthogonal (i.e., $[v_m\ \varphi_n v_m]^H \cdot [v_m\ -\varphi_n v_m]=0$), owing to the different signs applied to $\varphi_n$ for the two columns. These rank-2 precoders are likely to be used for those UEs that can receive strong signals along two orthogonal channels generated by the two differently polarized antennas.

Rel. 12 LTE Alternative 4-Tx Double Codebook

Based on a similar concept to that of 8-Tx, the alternative 4-Tx codebook can be written as follows:

$$\varphi_n = e^{j\pi n/2}$$

$$\varphi'_n = e^{j2\pi n/32}$$

$$v'_m = [1\ e^{j2\pi n/32}]^T \quad (1)$$

TABLE 4

Codebook for 1-layer CSI reporting using antenna ports 0 to 3 or 15 to 18

| | $i_2$ | | | | | | | |
|---|---|---|---|---|---|---|---|---|
| $i_1$ | 0 | 1 | 2 | 3 | 4 | 5 | 6 | 7 |
| 0-15 | $W_{i_1,0}^{(1)}$ | $W_{i_1,8}^{(1)}$ | $W_{i_1,16}^{(1)}$ | $W_{i_1,24}^{(1)}$ | $W_{i_1+8,2}^{(1)}$ | $W_{i_1+8,10}^{(1)}$ | $W_{i_1+8,18}^{(1)}$ | $W_{i_1+8,26}^{(1)}$ |

| | $i_2$ | | | | | | | |
|---|---|---|---|---|---|---|---|---|
| $i_1$ | 8 | 9 | 10 | 11 | 12 | 13 | 14 | 15 |
| 0-15 | $W_{i_1+16,4}^{(1)}$ | $W_{i_1+16,12}^{(1)}$ | $W_{i_1+16,20}^{(1)}$ | $W_{i_1+16,28}^{(1)}$ | $W_{i_1+24,6}^{(1)}$ | $W_{i_1+24,14}^{(1)}$ | $W_{i_1+24,22}^{(1)}$ | $W_{i_1+24,30}^{(1)}$ | where $$W_{m,n}^{(1)} = \frac{1}{2}\begin{bmatrix} v'_m \\ \varphi'_n v'_m \end{bmatrix}$$

TABLE 5

Codebook for 2-layer CSI reporting using antenna ports 0 to 3 or 15 to 18

| | $i_2$ | | | |
|---|---|---|---|---|
| $i_1$ | 0 | 1 | 2 | 3 |
| 0-15 | $W_{i_1,i_1,0}^{(2)}$ | $W_{i_1,i_1,1}^{(2)}$ | $W_{i_1+8,i_1+8,0}^{(2)}$ | $W_{i_1+8,i_1+8,1}^{(2)}$ |

| | $i_2$ | | | |
|---|---|---|---|---|
| $i_1$ | 4 | 5 | 6 | 7 |
| 0-15 | $W_{i_1+16,i_1+16,0}^{(2)}$ | $W_{i_1+16,i_1+16,1}^{(2)}$ | $W_{i_1+24,i_1+24,0}^{(2)}$ | $W_{i_1+24,i_1+24,1}^{(2)}$ |

| | $i_2$ | | | |
|---|---|---|---|---|
| $i_1$ | 8 | 9 | 10 | 11 |
| 0-15 | $W_{i_1,i_1+8,0}^{(2)}$ | $W_{i_1,i_1+8,1}^{(2)}$ | $W_{i_1,8,i_1+16,0}^{(2)}$ | $W_{i_1,8,i_1+16,1}^{(2)}$ |

| | $i_2$ | | | |
|---|---|---|---|---|
| $i_1$ | 12 | 13 | 14 | 15 |
| 0-15 | $W_{i_1,i_1+24,0}^{(2)}$ | $W_{i_1,i_1+24,1}^{(2)}$ | $W_{i_1,8,i_1+24,0}^{(2)}$ | $W_{i_1,8,i_1+24,1}^{(2)}$ | where $$W_{m,m',n}^{(2)} = \frac{1}{\sqrt{8}}\begin{bmatrix} v'_m & v'_{m'} \\ \varphi_n v'_m & -\varphi_n v'_{m'} \end{bmatrix}$$

For FD-MIMO that utilizes 2D antenna array (hence 2D precoding), the need for high-performance, scalable (with respect to the number and geometry of transmit antennas), and flexible CSI feedback framework and structure is necessary. To achieve high performance, more accurate CSI (preferably in terms of quantized MIMO channel) is needed at the eNB. This is especially the case for FDD scenarios where short-term reciprocity is infeasible. In this case, the previous LTE (e.g. Rel.12) precoding framework (PMI-based feedback) may need to be replaced. Yet feeding back the quantized channel coefficients can be excessive in terms of feedback requirements.

In this disclosure, the following properties of FD-MIMO are factored in for our proposed schemes:

1. The use of closely spaced large 2D antenna arrays (primarily geared toward high beamforming gain rather than spatial multiplexing) along with relatively small cluster spread for each UE: This allows "compression" or "dimensionality reduction" of the quantized channel feedback. In this case, a set of basis functions/vectors is used and quantization is basically expressing the MIMO channel in terms of a linear combination of those basis functions/vectors.

2. Low mobility as the target scenario for FD-MIMO: Possibility to update quantization parameters (long-term channel statistics such as channel angular spread) at a low rate, e.g. using UE-specific higher-layer signaling. In addition, CSI feedback can also be performed cumulatively.

3. While time-varying basis functions/vectors can be used (e.g. derived from EVD or SVD and fed back from the UE to the eNB), small channel angular spread warrants the use of a fixed master-set of basis functions/vectors derived primarily from the channel angular spread characteristics. For a given channel angular spread characteristic, a subset of the fixed master-set (pre-known both at the UE and the eNB) is chosen by the eNB and signaled to the UE.

The overall codebook construction operation according to some embodiments of the present disclosure is as follows (assuming the use of 2D antenna array):

1. The UE receives the channel state information reference signals (CSI-RS) configuration for $N_P$ antenna ports and corresponding CSI-RS. $N_P$ can be decomposed into $N_P = N_H \cdot N_V$. According to the notation in the embodiments associated with FIG. 5, $N_H = 2N$ and $N_V = M$. In one example, $N_V = 4$ and $N_H = 8$, wherein the x-pol dimension is counted towards a row rather than towards a column.

2. Having processed the CSI-RS, the UE derives channel quality information (CQI), PMI, and/or a rank indicator (RI), wherein:

2.1. RI corresponds to a recommended rank (number of transmission layers).

2.2. PMI corresponds to a recommended precoding matrix, each column of which, say w, is constructed with a linear combination of a number of basis vectors:

$$w = \sum_{l=1}^{L} c_l a_l \quad (2)$$

2.2.1. Here, $A = \{a_l\}$ is a set of basis vectors comprising L distinct basis vectors selected out of a mother set comprising a large number (>>L) of basis vectors, and each basis vector $a_l$ is an $N_P \times 1$ vector. In some later embodiments, a mother set is also referred to as a master set.

2.2.1.1. Configuration or reporting of the number of basis vectors L: In one method, L is higher-layer configured by the eNB. In another method, a UE reports a recommended value of L to the eNB.

2.2.1.2. With the antenna port indexing in FIG. 4B, $a_l$ can be further decomposed into: $a_l = h_l \otimes v_l$, wherein $h_l$ and $v_l$ are oversampled DFT vectors of size $N_H \times 1$ and $N_V \times 1$ respectively representing azimuth and elevation channel responses for a given pair of an azimuth angle and an elevation angle. In this case, the mother set can be a product set: $\{h \otimes v: h \in W_H, v \in W_V\}$.

2.2.1.2.1. The above Kronecker product formulation needs to be modified when a different antenna port indexing than what is depicted in FIG. 4B is used. For instance, if the indexing in FIG. 4A is assumed, the following equations should be used instead:

$a_l = v_l \otimes h_l,$ $\{v \otimes h: h \in W_H, v \in W_V\}. \quad (3)$ 2.2.1.2.2. For simplicity, the following mathematical descriptions below assume the antenna port indexing given in FIG. 4B. Those skilled in the art should be able to derive the corresponding (conceptually equivalent) equations from the disclosed expressions.

2.2.1.2.3. In one example, L=4. Furthermore, $v_l = v, \forall l$, wherein $v \in W_V$; and $H = \{h_l\}_{l=1,2,3,4}$ corresponds to four beams corresponding to $i_1$ in LTE Rel-10 8-Tx codebook (TABLE 2 and TABLE 3), i.e., $H = \{v_{2i}, v_{2i+1}, v_{2i+2}, v_{2i+3}\}$, wherein $v_m = [1\ e^{j2\pi n/32}\ e^{j4\pi n/32}\ e^{j6\pi n/32}]^T$.

2.2.1.3. $a_l$ can be further decomposed into:

$$a_l = \begin{bmatrix} h_l \\ e^{j\varphi_l} h_l \end{bmatrix} \otimes v_l,$$

wherein $h_l$ and $v_l$ are oversampled DFT vectors of size $N_H \times 1$ and $N_V \times 1$ respectively representing azimuth and elevation channel responses for a given pair of an azimuth angle and an elevation angle; and $$\varphi_l \in \left\{ \frac{2m\pi}{M} : m \text{ can be selected from a set of non-negative integers} \right\}$$

representing co-phase of x-pol array. In this case, the mother set can be a product set:

$$\left\{ \begin{bmatrix} h \\ e^{j\varphi} h \end{bmatrix} \otimes v : h \in W_H, v \in W_V, \varphi = 0, \frac{2\pi}{M}, \frac{2 \cdot 2\pi}{M}, \ldots, \frac{2(M-1)\pi}{M} \right\} \quad (4)$$

In one method, an index tuple $(i_1, i_2, i_3)$ indicates a basis vector $a_l$. Indices associated with $$\begin{bmatrix} h_l \\ e^{j\varphi_l} h_l \end{bmatrix}$$

are denoted as $i_1$ and $i_2$, set of which are mapped to specific precoders according to TABLE 2. Furthermore, indices related to $v_l$ are denoted as $i_3$, and they are one to one mapped to $Q_V$ oversampled DFT vectors of length $N_V$, wherein $Q_V$ is a positive integer representing the elevation codebook size, which can be determined as a function of $N_V$.

2.2.1.4. In one example, L=4. Furthermore, $v_l = v, \forall l$, wherein $v \in W_V$; and $H = \{h_l\}_{l=1,2,3,4}$ corresponds to four beams corresponding to $i_1$ in LTE Rel-10 8-Tx codebook (TABLE 2 and TABLE 3), i.e., $H = \{v_{2i}, v_{2i+1}, v_{2i+2}, v_{2i+3}\}$, wherein $v_m = [1\ e^{j2\pi n/32}\ e^{j4\pi n/32}\ e^{j6\pi n/32}]^T$.

2.2.1.5. For example, a DFT vector of size $4 \times 1$ is $v_m = [1\ e^{j2\pi n/D}\ e^{j4\pi n/D}\ e^{j6\pi n/D}]^T$, wherein $D = 2^n$, where n is a positive integer. Other size oversampled DFT vectors can be similarly constructed.

2.2.2. $C = \{c_l\}$ is a corresponding set of L scaling coefficients, each element of which is a complex number. Some alternatives for $c_l$ quantization are as follows.

2.2.2.1. Real and imaginary components of $c_l$ are separately quantized, $N_{Re}$ quantization bits for real dimension and $N_{Im}$ quantization bits for imaginary dimension. In one method, $N_{Re} = N_{Im}$.

2.2.2.2. Amplitude and phase components of $c_l$ are separately quantized, $N_A$ quantization bits for amplitude and $N_{Ph}$ quantization bits for phase.

2.2.2.3 Some details for the quantization methods can be found in U.S. patent application Ser. No. 14/593,711 filed on Jan. 9, 2015, which is hereby incorporated by reference in its entirety.

2.3. CQI corresponds to a modulation and coding scheme which allows the UE to receive a physical downlink shared channel (PDSCH) packet with a constant (e.g., 0.1) packet error probability when the selected PMI and the selected RI is used for precoding.

2.4. UE can select RI and PMI that allows the best (or highest) CQI for the PDSCH transmission with a constant (e.g., 0.1) error probability.

3. The UE report PMI/CQI/RI on a single physical uplink shared channel (PUSCH), when triggered for an aperiodic (PUSCH) report.

3.1. In one method, PMI corresponding to a basis vector set A is wideband (i.e., only one set is reported in the aperiodic report), the PMI corresponding to the coefficient set C is subband (i.e., multiple sets, e.g., one per subband are reported in the periodic report).

3.2. In one method, PMI corresponding to $h_l$ and $v_l$ are wideband, and the PMI corresponding to the coefficient set C and co-phasing factor $\varphi$ are subband.

4. The UE report CQI/PMI on a physical uplink control channel (PUCCH) in another subframe with a period P, RI on a PUCCH in one subframe with a period Q, when configured with a periodic report.

4.1. In one method, the PMI corresponding to a basis vector set A is less frequently reported (i.e., reported with larger period) than the PMI corresponding to the coefficient set C.

4.2. In another method, the PMI corresponding to $h_l$ and $v_l$ are less frequently reported than the PMI corresponding to the coefficient set C and co-phasing factor $\varphi$.

4.3. In the above two methods (a) and (b), the PMI that is reported less frequently is reported using the same manner and/or from the same PUCCH resource pool as rank indicator (RI).

4.4. In another method, the PMI corresponding to a basis vector set A and the PMI corresponding to the coefficient set C are reported together in one self-contained PMI report.

4.5. In one method, PMI corresponding to a basis vector set $\{a_l\}$ is less frequently reported (i.e., reported with larger period) than the PMI corresponding to the coefficient set $\{c_l\}$.

Embodiments of UE Feedback Definitions

Embodiment 1: Construction of Basis Vectors a and Indication of the L Basis Vectors It is desirable to use small feedback overhead for indicating the L basis vectors. To achieve this goal, one possibility is to decompose the information into a number of pieces, and to try to individually compress the information pieces, e.g., with exploiting correlation of each information piece across the frequency domain and across the basis vectors.

In one such method, a UE is configured to feed back at least the following three fields for informing the selected L basis vectors: a first field indicating a set of L vectors (denoted as $A_H = \{h_l : l=0, 1, \ldots, L-1\}$) representing azimuth domain channel directions; a second field indicating a vector (denoted as v) representing elevation domain channel directions; and a third field indicating a set of L co-phasing factors ($B = \{e^{j\varphi_l}, l=0, 1, \ldots, L-1\}$) representing phase differences between the two polarization directions. In this case, the corresponding basis vectors $A = \{a_l : l=0, 1, \ldots, L-1\}$ are determined by:

$$a_l = \begin{bmatrix} h_l \\ e^{j\varphi_l} h_l \end{bmatrix} \otimes v \quad (5)$$

Each field can have correlation across frequency domain and across basis vectors, which can be exploited to reduce the feedback overhead.

In one such method, a common co-phasing factor is assumed to be used for the all L the basis vectors, for the feedback information generation, i.e., $\varphi_l = \varphi, \forall l = 0, 1, \ldots, L-1$. This method can be used when the correlation of the co-phasing factors across the L basis vectors is high.

The first and the second fields are indicating the channel directions in the azimuth and the elevation domains, and the channel direction information is typically bandwidth independent. On the other hand, co-phasing factors are frequency selective.

Observing these channel properties, it is proposed that the first and the second fields are wideband; and the third field is subband. In one example when such a compression is applied together with the common co-phasing factor, 4 bits are used to indicate the first field, 2 bits are used for the second field and 2 bits are used for the third field. Then, the total number of bits used for the basis vector feedback for K subband in this case is (2K+6) bits (=4 bits+2 bits+2 bits K subbands).

For indication of the first field, a first PMI ($i_1$) of the Rel-10 8-Tx codebook (TABLE 2) can be reused, as essentially the first PMI indicates four oversampled DFT vectors. In this case, the number of basis vectors in the chosen subset L is fixed to be 4. With L=4, the first field comprises an integer i=0, 1, . . . , 15, which indicates the choice of four vectors of $v_{2i}, v_{2i+1}, v_{2i+2}, v_{2i+3}$, wherein $v_m = [1\ e^{j2\pi n/32}\ e^{j4\pi n/32}\ e^{j6\pi n/32}]^t$ per Rel-10 8Tx codebook (not to be confused with v above).

Similarly, the vector corresponding to the second field can be a DFT vector of $v_m = [1\ e^{j2\pi n/D}\ e^{j4\pi n/D}\ e^{j6\pi n/D}]^t$, wherein $D=2^n$, and n is a positive integer. This is an additional field which shares the same set of properties as the Rel-10 $i_1$.

The third field indicates co-phasing between two polarizations in the azimuthal dimension. Being all the angle related information wideband, the frequency selectivity of the channels should be captured by subband coefficients for the L basis vectors. Hence, it is proposed that the UE feeds back a set $C = \{c_l\}$ of L quantized coefficients per subband. It is noted that in some cases, only one of the L coefficients for a subband is 1, and the other L−1 coefficients are zero; in this case the newly proposed channel state information (CSI) feedback is reduced to the Rel-10 8-Tx codebook.

Since the third field (used for co-phasing) shares the same set of properties (sub-band tendency and faster update) as C feedback, it is possible to report the third field jointly with as C feedback. Separate reporting of the third field and C can also be done.

Embodiment 2: Alternative Constructions

Instead of maximally reusing the Rel-10 codebook structure, the following variations can be considered as well.

Consider a master set of basis vectors, $\{v_0^{(D)}, v_1^{(D)}, \ldots, v_{D-1}^{(D)}\}$, wherein $v_m^{(D)} = [1\ e^{j2\pi n/D}\ e^{j4\pi n/D}\ e^{j6\pi n/D}]^t$, for which some examples values for D are D=32, D=16, D=8 or D=4. In a special case where D=32, the basis vectors comprising master set is written with omitting the superscript (D), i.e., $\{v_0, v_1, \ldots, v_{31}\}$ in this disclosure.

Depending on user location and channel state, different UEs can have different angle spreads. For some UEs with small angle spread in Azimuth domain, a basis vector set comprising a consecutive basis vectors in the master set $A_H=\{v_{2i}, v_{2i+1}, v_{2i+2}, v_{2i+3}\}$, i=0, 1, ..., 31, which can be represented by W1 (or $i_1$ indication according to Rel-10 8-Tx codebook, wherein D=32) is sufficient to describe the channel matrix. Alternatively, for some other UEs with large angle spread, the consecutive basis vector set $A_H=\{v_1, v_{2i+1}, v_{2i+2}, v_{2i+3}\}$ does not give sufficient description.

Several methods to cope with such a diverse UE channel condition are proposed below:

In one method, a basis vector set $A_H$ comprises a set of L uniformly spaced beams within the master set of $\{v_0^{(D)}, v_1^{(D)}, \ldots, v_{D-1}^{(D)}\}$, wherein two adjacent beams in the set spaced apart by s, denoted as inter-beam spacing, where s is a positive integer.

For example, when s is configured with D=32, a UE selects a preferred basis vector set index i, for which a basis vector set i is $A_H(i)=\{v_{2i}, v_{2i+s}, v_{2i+2s}, v_{2i+3s}\}$, where i=0, 1, ..., 15.

Two alternatives are devised for configuring UE's processor of the basis vector set. In one alternative, eNB estimates downlink AOD spread from uplink (UL) sounding; and configures inter-beam spacing, s. In another alternative, UE selects and feeds back inter-beam spacing s to the eNB, based upon channel estimates from received reference signals. In some embodiments, selected s is wideband, and only one value of s is fed back for entire downlink (DL) frequency. In another embodiment, selected s is reported less frequently (with larger reporting period) than a basis vector set index i.

In this method, for signaling of s, a set S should be defined, whose elements are candidate values of s which eNB can choose from. In one example, S={s:s=1 or 2}, in which case the information size is one bit; in another example, S={s:s=1, 2, 3 or 4}, in which case the information size is two bits.

In another method, a basis vector set $A_H$ comprises a set of L consecutive beams within a master set of $\{v_0^{(D)}, v_1^{(D)}, \ldots, v_{D-1}^{(D)}\}$, wherein D is either configured by eNB or selected by UE. When D is selected by the UE, the UE feeds back information on D to the eNB. In some embodiments, a single value of D is fed back for entire DL frequency (i.e., D is wideband information).

For this operation, in one alternative, a set of possible values for D, master set size, is configured at the eNB and the UE. In one example, D∈{4,8,16,32}. In another alternative, a set of possible values of oversampling factor, x, or O, is configured at the eNB and at the UE. In one example, x∈{1,2,4,8} and D=x×N, or O×N wherein N is either a number of CSI-RS antenna ports corresponding to a CSI-RS resource or M number of columns in the 2D rectangular array in FIG. 5, or a half of number of antenna ports for the horizontal array, i.e., $$N = \frac{N_H}{2},$$

which corresponds to the number of columns in case of dual-pol antenna systems.

The feedback information can indicate either D or x. In one example, D∈{4,8,16,32} (or x∈{1,2,4,8}), and the UE reports a selected master set size using a 2-bit field.

In another method, UE selects and report a B number of basis vector set indices comprising a basis vector set, wherein basis vector set is indexed by i, $B_i=\{v_{2i}, v_{2i+1}, v_{2i+2}, v_{2i+3}\}$, where i=0, 1, ..., $2^I$−1. Here, I is the number of bits to encode the selected basis vector set; in one example, I=4. In addition, $v_m=[1\ e^{j2\pi n/D}\ e^{j4\pi n/D}\ e^{j6\pi n/D}]^t$, wherein some examples values for D are D=32 or D=16. By using such multiple sets, a wider spread of AOD or multiple AOD "cones" can be covered. In this case, the field (e.g. PMI) corresponding to different sets can be either jointly or separately coded.

In another method, the basis vector set comprises a set of L beams, $v_{2i+\alpha_0}, v_{2i+\alpha_1}, v_{2i+\alpha_2}, \ldots, v_{2i+\alpha_{L-1}}$ where $\alpha_0<\alpha_1<\alpha_2<\ldots<\alpha_{L-1}$ are distinct values.

In one alternative, L can be configured via higher layer (e.g. radio resource control (RRC)) signaling or included in the UL grant that carries the triggering for aperiodic CSI reporting. Then, for a given L, the UE feeds back a field which represents the choice of $\alpha_0<\alpha_1<\alpha_2<\ldots<\alpha_{L-1}$.

In another alternative, the choice of L at the eNB can be made based on the most recent value or the history of $i_1$ report. In this case, the choice of L by the eNB is left as an eNB implementation choice.

In another alternative, either a bitmap or a field that indicates a combination which specifies the subset of L precoding vectors is used.

In another method, UE is configured to select and report a basis vector set $A_H$, wherein the basis vector set comprises L basis vectors chosen from a master set.

In another method, the basis vector set comprises a set of L beams, $v_{\alpha_0}, v_{\alpha_1}, v_{\alpha_2}, \ldots, v_{\alpha_{L-1}}$ where $\alpha_0<\alpha_1<\alpha_2<\ldots<\alpha_{L-1}$ are distinct values selected from an integer set {0, 1, ..., D−1} and $v_m=[1\ e^{j2\pi n/D}\ e^{j4\pi n/D}\ e^{j6\pi n/D}]^T$, wherein some examples values for D are D=32 or D=16.

The selected beam combination is mapped to a bit field, namely "beam combination indicator (BCI) field" and coded & mapped onto either PUSCH or PUCCH.

In one example, D=16 and L=4, in which case the total number of combinations to choose L=4 out of D=16 candidate beams is (16 choose 4)=1820; then the BCI field size is $\lceil \log_2(1820) \rceil$=11 bits. In some embodiment, a subset of the 1820 combinations is indicated by the BCI field, in order to reduce number of bits in the field and to increase reliability of the received information.

In some embodiments, the BCI field is carried less frequently than the corresponding coefficients.

In some embodiments, a set of L beams indicated by the BCI field is wideband information, and it is used for calculating corresponding coefficients and CQI in all the subbands.

In some embodiments, only the BCI field is carried on a PUCCH, without multiplexing any other UL control information.

In some embodiments, the BCI field is coded and mapped on a PUSCH, as in the same way as RI is coded and mapped; this is to better protect the contents of the field.

In some embodiments, the BCI field is jointly coded and mapped with RI on a PUSCH, as in the same way as RI is coded and mapped; this is to better protect the contents of the field.

In some embodiments, the BCI field is jointly coded with the rest of the CQI/PMI on a PUSCH, as in the same way as CQI/PMI is coded and mapped.

In some embodiments, the BCI field is transmitted on the RI region of a PUSCH, to better protect the contents of the field.

In some embodiments, the BCI field is carried on a single-PRB PUSCH, wherein the information is coded and mapped according to PUSCH channel coding and mapping.

Embodiment 3: Master Set Restriction and Corresponding Indication of L Beams or Basis Vectors In some embodiments, additional information, namely master set restriction information, is configured at the UE in addition to the basis set index i, corresponding to a basis vector set $A_H(i)$. The master set restriction information can either be indicated by the eNB, or selected and fed back to the eNB by the UE.

In one method, the master set restriction information comprises either (restricted) master set size D, or oversampling factor x.

Consider a master set of basis vectors, $\{v_0, v_1, \ldots, v_{D_M-1}\}$, wherein $v_m = [1 \ e^{j2\pi n/D_M} \ e^{j4\pi n/D_M} \ e^{j6\pi n/D_M}]^t$, where $D_M = 32$.

In one example, when the restricted master set size D is configured, or when the oversampling factor x is configured, then the restricted master set becomes $\{v_0, v_d, v_{2d}, \ldots, v_{D_M-d}\}$ where $d=D_M/D$, $d=D_M/(Nx)$, wherein N is number of columns in the 2D rectangular array in FIG. 5, or a half of number of antenna ports for the horizontal array, i.e., $$N = \frac{N_H}{2},$$

which corresponds to the number of columns in case of dual-pol antenna systems. As an example when the restricted master set size D is configured as D=16, or when the oversampling factor x is configured as x=4, then the restricted master set becomes $\{v_0, v_2, v_4, \ldots, v_{D_M-2}\}$. As another example, when the restricted master set size D is configured as D=8, or when the oversampling factor x is configured as x=2, then the restricted master set becomes $\{v_0, v_4, v_8, \ldots, v_{D_M-4}\}$.

In one another method, the master set restriction information comprises an offset index f, as well as either (restricted) master set size D, or oversampling factor x. In one example, when an offset index f is configured as well as the restricted master set size D (or the oversampling factor x) is configured, then the restricted master set becomes $\{v_f, v_{f+d}, v_{f+2d}, \ldots, v_{f+D_M-d}\}$ where $d=D_M/D$, $d=D_M/(Nx)$.

In these methods, number of candidate basis vector sets can be differently configured dependent upon the choice of the restricted master set. In some embodiments, a UE is configured to report any combination of L basis vectors out of the restricted master set. The number of bits to convey a combination will be determined by the configured value of D. For example, if D=16, the number of bits to indicate a combination is $\lceil \log_2(1820) \rceil = 11$; if D=8, the number of bits to indicate a combination is $\lceil \log_2(_8C_2) \rceil = \lceil \log_2 70 \rceil = 7$ bits.

In some embodiments, a UE is configured to report L consecutive basis vectors in the restricted master set, and the number of bits to feedback information on a set of basis vectors is determined according to the size of the restricted master set.

In some embodiments, a UE is configured to separately report information of the master set restriction information and a basis vector combination. In these embodiments, the master set restriction information is wideband information, and only one value is fed back for entire DL frequency. In addition, the master set restriction information is reported less frequently (with larger reporting period) than a basis vector set index i.

In some embodiments, a UE is configured to report jointly coded information of the master set restriction information and a basis vector combination.

In some examples where L=4:

When D=32 (or x=8), the master set is $\{v_0, v_1, \ldots, v_3\}$; and the UE is configured to report a set of 4 consecutive vectors, $A_H(i)$, in the restricted master set according to the beam index, according to $A_H(i) = \{v_{2i}, v_{2i+1}, v_{2i+2}, v_{2i+3}\}$, i=0, 1, . . . , 15. The UE is configured to use four bits for reporting information on a basis-vector combination in this case;

When D=16 (or x=4), the master set is $\{v_0, v_2, \ldots, v_{30}\}$; and the UE is configured to report a set of 4 consecutive vectors, $A_H(i)$, in the restricted master set according to the beam index, according to $A_H(i) = \{v_{2i}, v_{2i+2}, v_{2i+4}, v_{2i+6}\}$, i=0, 1, . . . , 15. The UE is configured to use four bits for reporting information on a basis-vector combination in this case;

When D=8 (or x=2), the master set is $\{v_0, v_4, \ldots, v_{28}\}$; and the UE is configured to report a set of 4 consecutive vectors, $A_H(i)$, in the restricted master set according to the beam index, according to $A_H(i) = \{v_{4i}, v_{4i+4}, v_{4i+8}, v_{4i+12}\}$, i=0, 1, . . . , 7. The UE is configured to use three bits for reporting information on a basis-vector combination in this case; and When D=4 (or x=1), the master set is $\{v_0, v_8, v_{16}, v_{24}\}$, in this case the UE does not report $A_H(i)$ and $A_H(i) = \{v_0, v_8, \ldots, v_{24}\}$.

In other examples, where L=4:

When D=32 (or x=8), the master set is $\{v_0, v_1, \ldots, v_{31}\}$; and the UE is configured to report a set of 4 consecutive vectors, $A_H(i)$, in the restricted master set according to the beam index, according to $A_H(i) = \{v_{2i}, v_{2i+1}, v_{2i+2}, v_{2i+3}\}$, i=0, 1, . . . , 15. The UE is configured to use four bits for reporting information on a basis-vector combination in this case;

When D=16 (or x=4), the master set is $\{v_0, v_2, \ldots, v_{30}\}$; and the UE is configured to report a set of 4 consecutive vectors, $A_H(i)$, in the restricted master set according to the beam index, according to $A_H(i) = \{v_{4i}, v_{4i+2}, v_{4i+4}, v_{4i+6}\}$, i=0, 1, . . . , 7. The UE is configured to use three bits for reporting information on a basis-vector combination in this case;

When D=8 (or x=2), the master set is $\{v_0, v_4, \ldots, v_{28}\}$; and the UE is configured to report a set of 4 consecutive vectors, $A_H(i)$, in the restricted master set according to the beam index, according to $A_H(i) = \{v_{8i}, v_{8i+4}, v_{8i+8}, v_{8i+12}\}$, i=0, 1, . . . , 4. The UE is configured to use two bits for reporting information on a basis-vector combination in this case;

When D=4 (or x=1), the master set is $\{v_0, v_8, v_{16}, v_{24}\}$, in this case the UE does not report $A_H(i)$ and $A_H(i) = \{v_0, v_8, \ldots, v_{24}\}$; and When the master set restriction and the basis vector set are jointly coded, the total number of states to indicate a basis vector set in this example is 16 (for D=32)+8 (for D=16)+4 (for D=8)=28, which can be coded using a $\lceil \log_2(28) \rceil = 5$ bit field. TABLE 6 shows one such example.

TABLE 6

An alternative basis vector
set (or beam set) indicator mapping

| Basis vector set indicator index (5 bits) | Master set size (D) or subsampling factor (x) | Basis vector combination index (i) | Basis vector set ($A_H(i)$) |
|---|---|---|---|
| 0, . . . , 15 | D = 32 or x = 8 | 0, . . . 15 | $\{v_{2i}, v_{2i+1}, v_{2i+2}, v_{2i+3}\}$ |
| 16, . . . , 23 | D = 16 or x = 4 | 0, . . . , 7 | $\{v_{4i}, v_{4i+2}, v_{4i+4}, v_{4i+6}\}$ |
| 24, . . . , 27 | D = 8 or x = 2 | 0, . . . , 3 | $\{v_{8i}, v_{8i+4}, v_{8i+8}, v_{8i+12}\}$ |
| 28 | D = 4 or x = 1 | 0 | $\{v_0, v_8, v_{16}, v_{24}\}$ |
| 29, 30, 31 | Reserved | reserved | |

In some embodiments, the master set and basis vector set indicator index is jointly coded with the rest of the CQI/PMI on a PUSCH, as in the same way as CQI/PMI is coded and mapped.

In some embodiments, the four different offset values f∈{0,2,4,6} is used when D=4 (or x=1), then four basis vector combinations are associated with D=4, which are $\{v_f, v_{f+8}, v_{f+16}, v_{f+24}\}$, f∈{0,2,4,6}. In this case, a table for basis vector set indicator is constructed according to TABLE 7.

TABLE 7

An alternative basis vector
set (or beam set) indicator mapping

| Basis vector set indicator index (5 bits) | Master set size (D) or subsampling factor (x) | Basis vector combination index (i) | Basis vector set ($A_H(i)$) |
|---|---|---|---|
| 0, . . . , 15 | D = 32 or x = 8 | 0, . . . 15 | $\{v_{2i}, v_{2i+1}, v_{2i+2}, v_{2i+3}\}$ |
| 16, . . . , 23 | D = 16 or x = 4 | 0, . . . , 7 | $\{v_{4i}, v_{4i+2}, v_{4i+4}, v_{4i+6}\}$ |
| 24, . . . , 27 | D = 8 or x = 2 | 0, . . . , 3 | $\{v_{8i}, v_{8i+4}, v_{8i+8}, v_{8i+12}\}$ |
| 28, 29, 30, 31 | D = 4 or x = 1 | 0, . . . , 3 | $\{v_{2i+0}, v_{2i+8}, v_{2i+16}, v_{2i+24}\}$ |

Embodiment 4: H and V PMI Construction with Master Set Restriction and Corresponding Indication of L Basis Vectors In the case of x-pol 2D rectangular antenna array as in FIG. 5, basis vectors $A(i,k)=\{a_k(i,k):l=0, 1, \ldots, L-1\}$ can have the following form:

$$a_l(i,k) = \begin{bmatrix} h_l(i) \\ e^{j\varphi_l} h_l(i) \end{bmatrix} \otimes v_l(k),$$

wherein $h_l(i) \in A_H(i)$ is constructed according to some embodiments in the present disclosure.

In some embodiments, $v_l(k)=v(k)$, l=0, 1, . . . , L−1, k=0, . . . , K−1. In this case, information on a single vector v(k) is coded and fed back to the eNB by the UE for each k. In one particular example, the number of antenna ports for the V-PMI feedback is two, and v(k) is a 2×1 vector.

In one example, v(k) is selected from a LTE 2-Tx rank-1 codebook, i.e., $$v(k) = \frac{1}{\sqrt{2}} \begin{bmatrix} 1 & e^{j\frac{2\pi k}{4}} \end{bmatrix}^t,$$

k=0, 1, 2, 3, in which case K=4.

In another example, v(k) is selected from an oversampled DFT codebook with oversampling factor y, i.e., $$v(k) = \frac{1}{\sqrt{2}} \begin{bmatrix} 1 & e^{j\frac{2\pi k}{2y}} \end{bmatrix}^t,$$

k=0, 1, . . . 4y−1, wherein y is a positive integer. The oversampling factory can either be indicated by the eNB to the UE; or be configured by the UE and fed back to the eNB. The number of states for v(k) (and the number of information bits for v(k)) can vary dependent upon the configured value of y: in one example, the number of information bits is $1+\lceil \log_2 y \rceil$.

In some embodiments, two separate oversampling factors, x and y, or $O_1$ and $O_2$ can be configured respectively for H-PMI (denoted as i) and V-PMI (denoted as k).

Embodiment 5: Linear Combination Coefficient Quantization

The linear combination (LC) coefficient quantization is one of the critical components for determining the feedback overhead of the proposed method. Typical wireless channel condition can allow wideband and long-term feedback of basis vector set; however the channel condition makes it necessary that the quantization and reporting of the LC coefficients should be done in subband and short-term manner. Hence, it is important to use small number of bits for LC coefficient quantization.

In Rel-10 8-Tx codebook, only a very coarse quantization is supported; a UE can select one vector out of L=4 basis vectors, the information of which requires only 2 bit information: (4 choose 1)=4=2 bits. Together with the x-pol co-phasing selection (2 bits), Rel-10 8-Tx codebook had assigned total 4 bits for $i_2$ feedback as seen in TABLE 2 and TABLE 3.

In this embodiment, it is proposed to use a larger number of quantization bits for the coefficient quantization to increase the accuracy of the quantized channel matrix. A few methods are devised below.

In one method, binary quantization is used for quantization of each of L=4 coefficients for the L=4 basis vectors, one bit per coefficient, i.e., $c_l \in \{0,1\}$. In one example, a 4-bit bitmap is used to report (or indicate) the L=4 coefficients. In another example, the L=4 binary coefficients are jointly quantized, in which case a number of bits are used for reporting the L=4 coefficients is <4. In another example, a 3 bit field quantize the L=4 binary coefficients, wherein 6 states of the 3 bit field indicates all of the 6 (=4 choose 2) combinations of two basis vector selection: [1 1 0 0], [1 0 1 0], [1 0 0 1], [0 1 1 0], [0 1 0 1], [0 0 1 1].

For co-pol antenna case, the resultant precoding vector w constructed according to this method is represented by the following expression:

$$w = [a_0 \ a_1 \ a_2 \ a_3] \begin{bmatrix} c_0 \\ c_1 \\ c_2 \\ c_3 \end{bmatrix}, \text{ where } c_l \in \{0, 1\}, l = 0, 1, 2, 3 \quad (6)$$

For x-pol antenna case, the resultant precoding vector w constructed according to this method is represented by the following expression:

$$w = \begin{bmatrix} a_0 & a_1 & a_2 & a_3 & & 0 & \\ & 0 & & a_0 & a_1 & a_2 & a_3 \end{bmatrix} \begin{bmatrix} c_0 \\ c_1 \\ c_2 \\ c_3 \\ e^{j\varphi}c_0 \\ e^{j\varphi}c_1 \\ e^{j\varphi}c_2 \\ e^{j\varphi}c_3 \end{bmatrix}, \quad (7)$$

where $c_l \in \{0,1\}$, $l=0, 1, 2, 3$ and $e^{j\varphi}$ is x-pol co-phasing.

In this x-pol case, a quantization index of linear-combination coefficients and x-pol co-phasing can be either separately or jointly encoded.

In one method, LC coefficients are quantized with a PMI precoding matrix, according to LTE 4 Tx PMI codebook, or critically sampled 4-Tx DFT codebook. It is noted that the L-Tx PMI codebook should be selected when L basis vectors are configured for the linear combination channel reconstruction.

In one method, we can have co-phasing between the selected beams in addition to the traditional x-pol co-phasing in x-pol case. In one example, a 5 bit field to quantize the L=4 binary coefficients, wherein 3 bits are used to indicate all of the 6 (=4 choose 2) combinations of two basis vector selection: [1 $e^{j\alpha}$ 0 0], [1 0 $e^{j\alpha}$ 0], [1 0 0 $e^{j\alpha}$], [0 1 $e^{j\alpha}$ 0], [0 1 0 $e^{j\alpha}$], [0 0 1 $e^{j\alpha}$], and 2 bits are used to indicate the co-phasing $\alpha \in \{0, \pi/2, \pi, 3\pi/2\}$ between the selected beams.

In one method, for co-pol antenna case, the resultant precoding vector w constructed according to this method is represented by the following expression:

$$w = [a_0 \ a_1 \ a_2 \ a_3] \begin{bmatrix} c_0 \\ e^{j\alpha_1}c_1 \\ e^{j\alpha_2}c_2 \\ e^{j\alpha_3}c_3 \end{bmatrix}, \quad (8)$$

where $c_l \in \{0,1\}$, $a_l \in \{0, \pi/2, \pi, 3\pi/2\}$, $l=0, 1, 2, 3$

For x-pol antenna case, the resultant precoding vector w constructed according to this method is represented by the following expression:

$$w = \begin{bmatrix} a_0 & a_1 & a_2 & a_3 & & 0 & \\ & 0 & & a_0 & a_1 & a_2 & a_3 \end{bmatrix} \begin{bmatrix} c_0 \\ e^{j\alpha_1}c_1 \\ e^{j\alpha_2}c_2 \\ e^{j\alpha_3}c_3 \\ e^{j\varphi}c_0 \\ e^{j\varphi}e^{j\alpha_1}c_1 \\ e^{j\varphi}e^{j\alpha_2}c_2 \\ e^{j\varphi}e^{j\alpha_3}c_3 \end{bmatrix}, \quad (9)$$

where $c_l \in \{0,1\}$, $\alpha_l \in \{0, \pi/2, \pi, 3\pi/2\}$ $l=0, 1, 2, 3$ and $e^{j\varphi}$ is x-pol co-phasing.

In this x-pol case, a quantization index of linear-combination coefficients, beam co-phasing, and x-pol co-phasing can be either separately or jointly encoded.

In another method, the linear combination coefficients are allowed to take magnitude values from a magnitude set. In one example, the magnitude set can be $\{0.5, 1, 1.5, 2\}$. In this example, two bits are used to indicate the magnitude of the linear combination coefficients. In this example, two bits indicate one common magnitude for all four linear coefficients. Alternatively, a two bit indication is allowed for each of the linear combination coefficients.

In one method, magnitudes and co-phasings are quantized for the selected beams separately using separate codebooks. In another method, magnitudes and co-phasings are quantized jointly using a joint codebook. The codebooks can be scalar codebooks or vector codebooks.

In another method, the four coefficients are quantized using a vector codebook of appropriate length, for example, length-4 vector quantizer. The codebook can be training based adaptive or universal and non-adaptive.

Embodiment 6: Feedback Construction for $\{a_l\}$:
Indication of L Index Tuples ($i_1$, $i_2$, $i_3$) for the L Basis Vectors A UE is configured to construct $\{a_l\}$, according to the decomposition of $$a_l = \begin{bmatrix} h_l \\ e^{j\varphi_l} h_l \end{bmatrix} \otimes v_l,$$

wherein $h_l$ and $v_l$ are oversampled DFT vectors of size $N_H \times 1$ and $N_V \times 1$ respectively representing azimuth and elevation channel responses for a given pair of an azimuth angle and an elevation angle; and $$\varphi_l \in \left\{ \frac{2m\pi}{M} : m = 0, 1, 2, \ldots M-1 \right\}$$

representing co-phase of x-pol array. In this case, the mother set is a product set:

$$\left\{ \begin{bmatrix} h \\ e^{j\varphi} h \end{bmatrix} \otimes v : h \in W_H, v \in W_V, \varphi = 0, \frac{2\pi}{M}, \frac{2 \cdot 2\pi}{M}, \ldots, \frac{2(M-1)\pi}{M} \right\}.$$

An index tuple ($i_1$, $i_2$, $i_3$) indicates a basis vector $a_l$. Indices associated with $$\begin{bmatrix} h_l \\ e^{j\varphi_l} h_l \end{bmatrix}$$

denoted as $i_1$ and $i_2$, set of which are mapped to specific precoders according to TABLE 2 or TABLE 4 for 8-Tx or 4-Tx, respectively. Furthermore, indices related to $v_l$ are denoted as $i_3$, and they are one to one mapped to $Q_V$ oversampled DFT vectors of length $N_V$, wherein $Q_V$ is a positive integer representing the elevation codebook size, which can be determined as a function of $N_V$.

Three options of feeding back L index tuples for the L basis vectors are devised below. For the ease of illustration, it is assumed that $i_1 \in \{0, 1, 2, 3\}$ (i.e., 4 bits of information), $i_2 \in \{0, 1, 2, \ldots, 15\}$ (i.e., 4 bits of information), and $i_3 \in \{0, 1, 2, 3\}$ (i.e., 2 bits of information).

1. Separate feedback of L index tuples for the L basis vectors: Eight bits are used for conveying $(i_1, i_2)$ and; then total 10 bits are used for conveying all three indices per subband. If a UE is configured to report the index tuple for 10 subbands and L=4, then the total number of bits to feed back is 400 bits (=10 subbands 4 basis vectors·(4+4+2) bits).

2. Wideband & basis-common feedback of $i_3$: A UE is configured to feed back a single wideband $i_3$ value, which is also commonly used for constructing all the L basis vectors. If the UE is further configured to report the index tuple for 10 subbands and L=4, then the total number of bits to feed back is 322 bits (=2+10 subbands·4 basis vectors·(4+4) bits).

3. Wideband & basis-common feedback of $i_1$ and $i_3$: A UE is configured to feedback single wideband $i_1$ and $i_3$ values, which is also commonly used for constructing all the L=4 basis vectors. The four $i_2$ values for the L=4 basis vectors for each subband are 4k, 4k+1, 4k+2 and 4k+3, where k=0, 1, 2, 3. The UE is configured to feedback k=0, 1, 2, 3 per subband for informing the decision of $i_2$ to the BS. If the UE is further configured to report the index tuple for 10 subbands, then the total number of bits to feed back is 26 bits (=4+2+10 subbands 2 bits).

The rank-1 design in these embodiments can be extended to rank-2 transmission which corresponds to TABLE 3 or TABLE 5 for 8-Tx and 4-Tx, respectively. Feedback mechanism for it and $i_2$ can be designed based on the procedure in Rel.12 LTE (either on PUSCH or the two submodes of PUCCH mode 1-1).

Embodiment 7: Another Alternative Construction

In some embodiments, eNB configures a UE to feed back a preferred precoding vector/matrix according to double codebook structure, in which case a UE feeds back to indices to indicate the precoder: $i_1$ and $i_2$: $i_1$ is used for indicating a set of basis vectors, i.e., $a_l, l=1, \ldots, L$, and $i_2$ is used for indicating a set of coefficients, i.e., $c_l, l=1, \ldots, L$.

In these embodiments, eNB can further configure a UE regarding which set of coefficients to construct the precoder for CSI feedback. In one such example, eNB configures a UE to use one of a number of (e.g., two) methods to map an index $i_2$ to a set of coefficients. A first such method is the legacy 8-Tx codebook, i.e., TABLE 2, and a second such method is a new mapping, facilitating better channel quantization for MU-MIMO operations. In this case, the eNB can configure the first method to those UEs which the eNB intends to schedule using single-user MIMO (SU-MIMO); the second method to those UEs which the eNB intends to schedule using multi-user MIMO (MU-MIMO).

In one embodiment, the eNB configures 8 CSI-RS for a UE, and configures UE to feed back a preferred precoding vector/matrix according to double codebook structure; and further configures to feedback selected basis vectors and corresponding coefficient vector with two indices $i_1$ and $i_2$. If TABLE 2 is used for basis vector quantization, the selected basis vectors are $a_l = v_{2i_1+l}, l=1, \ldots, L=4$; on the other hand, eNB can further configure a coefficient quantization method for the UE.

In one case, the eNB further configures legacy codebook and coefficient quantization for the UE, to feedback CSI according to TABLE 2. Then, the selected coefficient vector can be represented by an indicator vector $e_{\lfloor i_2/4 \rfloor}$, wherein $e_i$ is a L×1 vector, whose i-th component is 1, and all the other components are zero. In this case, together with a co-phasing factor $\varphi_n, n = i_2 \bmod 4$, the overall precoding vector (matrix) is represented by:

$$W = \frac{1}{\sqrt{8}} \begin{bmatrix} v_{2i_1} & v_{2i_1+1} & v_{2i_1+2} & v_{2i_1+2} & 0 \\ 0 & & & v_{2i_1} & v_{2i_1+1} & v_{2i_1+2} & v_{2i_1+2} \end{bmatrix} \begin{bmatrix} e_{\lfloor i_2/4 \rfloor} \\ \varphi_n e_{\lfloor i_2/4 \rfloor} \end{bmatrix} \quad (10)$$

In another case, the eNB further configures the UE to feedback CSI according to a new LC coefficient mapping method (from $i_2$ to LC coefficients). The LC coefficients can be quantized according to any example in Embodiment 3, in one such case, the overall precoding vector (matrix) is constructed by:

$$W = \frac{1}{\sqrt{8}} \begin{bmatrix} v_{2i_1} & v_{2i_1+1} & v_{2i_1+2} & v_{2i_1+2} & 0 \\ 0 & & & v_{2i_1} & v_{2i_1+1} & v_{2i_1+2} & v_{2i_1+2} \end{bmatrix} \begin{bmatrix} \begin{bmatrix} c_0 \\ c_1 \\ c_2 \\ c_3 \end{bmatrix} \\ \begin{bmatrix} \varphi_0 c_0 \\ \varphi_1 c_1 \\ \varphi_2 c_2 \\ \varphi_3 c_3 \end{bmatrix} \end{bmatrix} \quad (11)$$

In this case, the coefficient vector and the co-phasing factor $$\begin{bmatrix} c_0 \\ c_1 \\ c_2 \\ c_3 \end{bmatrix}$$

and $$\begin{bmatrix} \varphi_0 \\ \varphi_1 \\ \varphi_2 \\ \varphi_3 \end{bmatrix}$$

can be either jointly or separately coded, and mapped to an index $i_2$. In a special case, $\varphi_0=\varphi_1=\varphi_2=\varphi_3$, and only one co-phasing factor is quantized and fed back.

Figure 6:
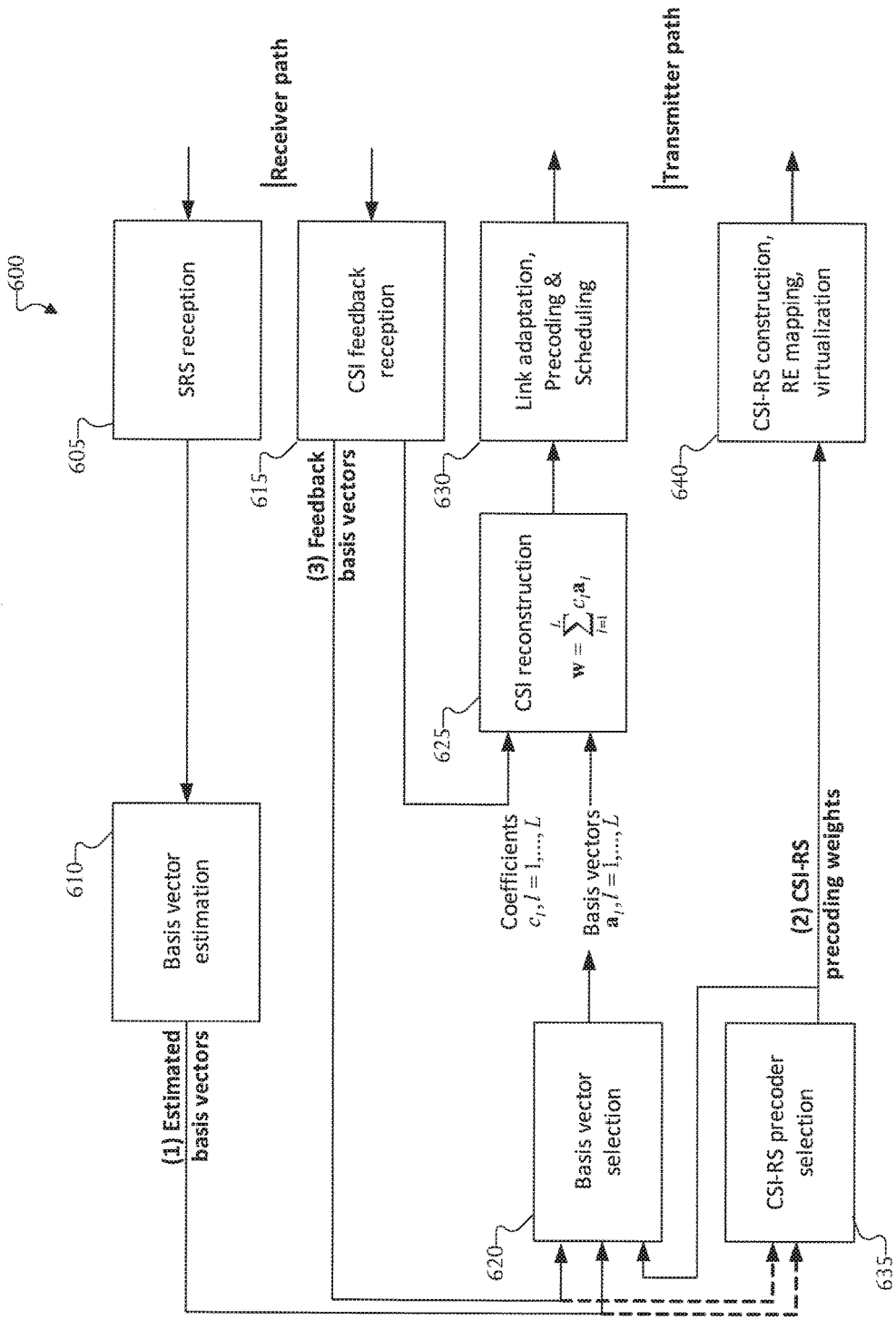
FIG. 6 illustrates an overall precoding operation of a base station according to this disclosure.

FIG. 6 illustrates an overall precoding operation 600 of a base station (BS, or enhanced node B, eNB) according to embodiments of the present disclosure. The embodiment shown in FIG. 6 is for illustration only. Other embodiments could be used without departing from the scope of the present disclosure.

The eNB comprises basis vector selection 620 and CSI reconstruction 625. The CSI reconstruction 625 takes at least two inputs, including L coefficients and L basis vectors, wherein L is a positive integer. The coefficients are obtained by CSI feedback reception 615; while basis vectors are obtained by the basis vector selection 620. The basis vector selection 620 utilizes a number of conditions to determine a set of L basis vectors for CSI reconstruction 625. There are at least three candidate schemes to determine the set of L basis vectors:

Scheme 1: estimated basis vectors taking UL SRS (or, in general, any set of UL signals) as an input (SRS Reception 605→Basis vector estimation 610);

Scheme 2: CSI-RS precoding weights (CSI-RS precoder selection 635→CSI-RS construction 640); and Scheme 3 feedback basis vectors (CSI feedback reception 615).

In the case of L=1, in which only one basis vector is selected, the linear combination reduces to a single term, comprising a product of the single selected basis vector and the corresponding single LC coefficient. In this case, the single basis vector corresponds to either a precoding vector used for precoding the CSI-RS, or a precoding vector corresponding to PMI reported by the UE. In addition, the single LC coefficient corresponds to the channel quality along the direction of the precoding vector. In this case, the eNB utilizes the precoding vector and the channel quality for link adaptation, scheduling and precoding 630.

For each UE, one of those three schemes can be chosen for selecting the set of L basis vectors. In other words, a UE can be configured with one of those three schemes. This selection depends on at least one condition (such as one which is related to deployment scenarios). Although each of the three schemes is self-contained and hence capable of operating by itself, a combination of at least two schemes can also be used for a UE. The details are described below.

A base station (BS, or eNB) is equipped with a controller, wherein the controller can process linear combination (LC) coefficients, $c_l, l=1, \ldots, L$, to reconstruct a channel state or a precoder vector/matrix according to an equation of $$w = \sum_{l=1}^{L} c_l a_l,$$

wherein the LC coefficients are fed back by a subscriber station (or a UE), and w is a reconstructed channel vector (can be a rank-1 precoding vector preferred by the UE), and $a_l, l=1, \ldots, L$, is a basis vector for the linear combination, wherein to determine $a_l, l=1, \ldots, L$, the controller is capable of selecting one out of at least one of the following three methods, based upon a number of conditions. Each of these methods corresponds to an operational mode.

Figure 7A:
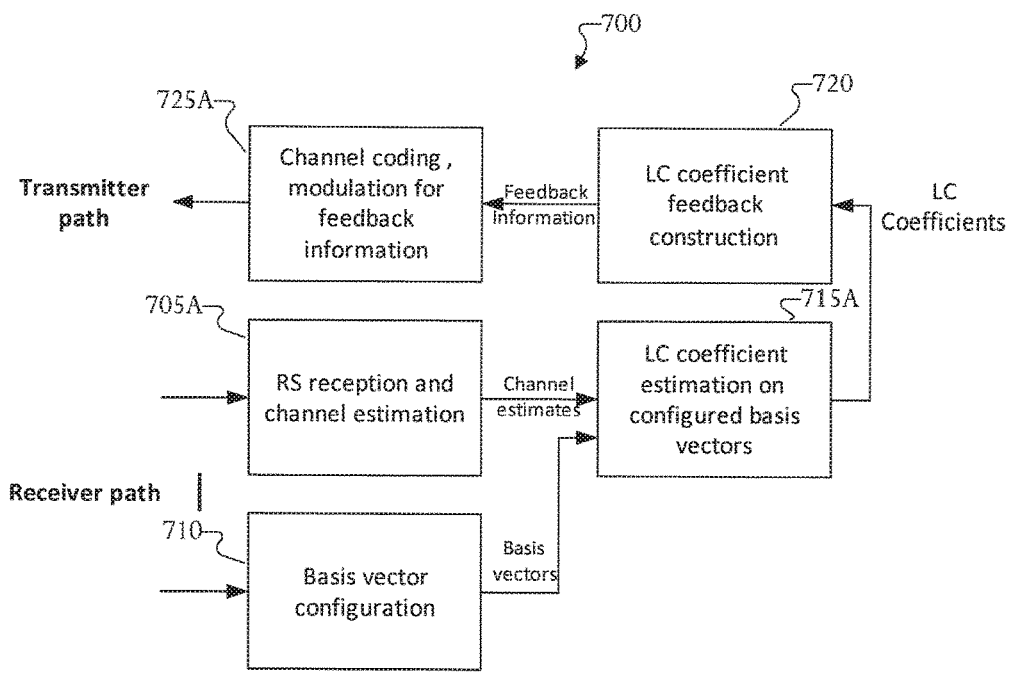
FIGS. 7A, 7B and 7C illustrate the UE operations when eNB uses Methods 1 to 3, respectively, according to this disclosure.

FIG. 7A illustrates the UE precoding block diagram 700 when eNB uses Method 1. The embodiment shown in FIG. 7A is for illustration only. Other embodiments could be used without departing from the scope of the present disclosure.

In Method 1, information on $a_l, l=1, \ldots, L$ is configured to the UE, and the same $a_l, l=1, \ldots, L$ as configured to the UE is used for the linear combination. The selection of L basis vectors (out of a larger master-set of basis vectors) is performed by the BS, with utilizing SRS and UL/DL channel reciprocity (i.e., Scheme 1). This is disclosed in and U.S. Provisional Patent Application Ser. No. 62/059,664 filed on Oct. 3, 2014, which is hereby incorporated by reference in its entirety.

The UE receives basis vectors (as a part of UE-specific eNB configuration) at block 710 and performs LC coefficient estimation (that is, LC coefficient computations) at block 715A based on the configured set of L basis vectors received from block 710. Block 720 for LC coefficient estimation also takes CSI-RS or CRS or any RS used for CSI estimation as additional input to calculate LC coefficients. Then, the LC coefficients are quantized and fed back to the eNB, e.g., in a form of one PMI or multiple PMIs at block 725.

Figure 7B:
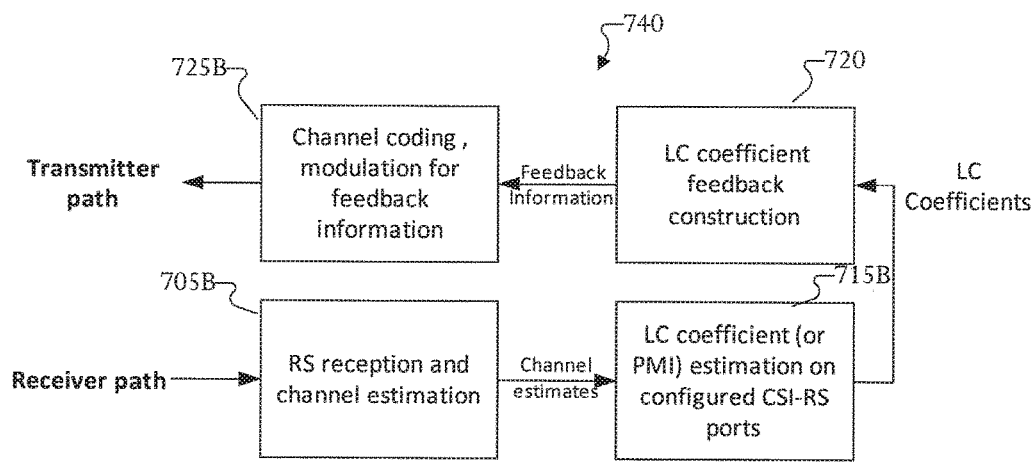

FIG. 7B illustrates the UE precoding block diagram 740 when eNB uses Method 2. The embodiment shown in FIG. 7B is for illustration only. Other embodiments could be used without departing from the scope of the present disclosure.

In Method 2, $a_l, l=1, \ldots, L$ is the l-th precoding weight vector applied on the antenna elements to construct l-th CSI-RS beam for the UE (i.e., Scheme 2), wherein the eNB configures the UE with L CSI-RS. In this case, each CSI-RS is precoded with a corresponding precoding weight vector. This has been proposed in U.S. patent application Ser. No. 14/149,436 filed on Jan. 7, 2014, which is hereby incorporated by reference in its entirety.

The UE receives precoded CSI-RS or CRS or any RS used for CSI estimation at block 705A, and computes the LC coefficients at block 715B. So block 715B for the basis vector estimation takes the received RS as an input to calculate the associated LC coefficients and basis vectors. Then, the LC coefficients are quantized and fed back to the eNB through blocks 720 to 725. In some embodiments, the precoding weight vector applied to CSI-RS is UE-specific, and they can be derived utilizing the UE CSI feedback (feedback basis vectors) and/or UL channel estimation (estimated basis vectors). In some embodiments, the precoding weight vectors are cell-specific and can generate grid of beams covering the azimuth and elevation angle spaces.

Figure 7C:
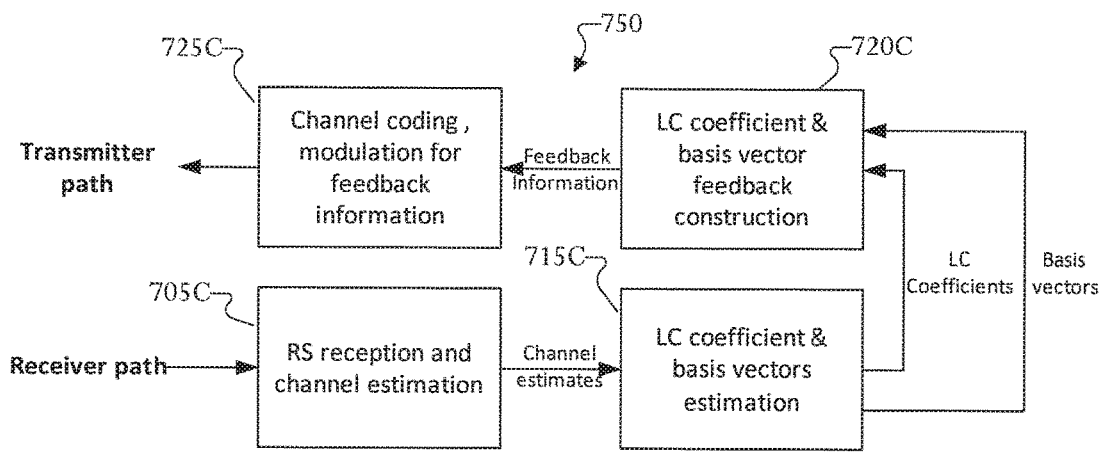

FIG. 7C illustrates the UE operation 750 when eNB uses Method 3 according to embodiments of the present disclosure. The embodiment shown in FIG. 7C is for illustration only. Other embodiments could be used without departing from the scope of the present disclosure.

In Method 3, information to construct $a_l, l=1, \ldots, L$ is fed back by the UE (i.e., Scheme 3). In one example, the eNB having configured 8 CSI-RS for the UE, can process the first PMI index, $i_1$ (or W1) which is fed back by the UE to construct $a_l, l=1, \ldots, L=4$, according to TABLE 2. In this case, the selected basis vector set is $\{v_{2i_1}, v_{2i_1+1}, v_{2i_1+2}, v_{2i_1+3}\}$. In another example, the eNB having configured 4 CSI-RS for the UE, can process the first PMI index, $i_1$ (or W1) that is fed back by the UE to construct $a_l, l=1, \ldots, L=4$, according to TABLE 4. In this case, the selected basis vector set is $\{v'_{i_1}, v'_{i_1+8}, v'_{i_1+16}, v'_{i_1+24}\}$. While antenna/TXRU virtualization can be performed across the said CSI-RS ports, the said CSI-RS ports are typically not precoded.

The UE receives CSI-RS used for CSI estimation at block 705C and determines the subset of L basis vectors at block 715C. Block 715C for the LC coefficient (or PMI) estimation takes the received CSI-RS as an input to calculate LC coefficients (or PMI). Then, the LC coefficients are quantized at block 720C and fed back to the eNB in the form of one PMI or multiple PMIs along with signaling that corresponds to the choice of L basis vectors at block 725C.

In some embodiments, at least all the three aforementioned methods are supported by the eNB. At a given time within a given CSI process, the eNB configures each UE with one method depending on at least one switching or selection criterion. This configuration is UE-specific although it is possible to employ a cell-specific configuration as well. Some exemplary guidelines for devising a switching criterion are given below.

The CSI-related operations that need to be computed at the eNB and each of the UEs are given in the TABLE 8 and TABLE 9 below.

TABLE 8

CSI-related operations on transmit paths

|  | Method 1 | Method 2 | Method 3 |
| --- | --- | --- | --- |
| eNB | Compute subset of L basis vectors; Signal subset selection to the UE | Compute subset of L basis vectors; Precode L CSI-RS ports for the UE | — |
| UE | Compute L LC coefficients; Feedback coefficients to eNB | Compute L LC coefficients; Feedback coefficients to eNB | Compute subset of L basis vectors; Compute L LC coefficients; Feedback subset selection and coefficients to eNB |

TABLE 9

CSI-related operations on receive paths

|  | Method 1 | Method 2 | Method 3 |
| --- | --- | --- | --- |
| UE | Receive and decode subset selection of L basis vectors; | Receive and decode subset selection of L basis vectors; | — |
| eNB | Receive and decode L LC coefficients (feedback); Reconstruct channel or precoder; | Receive and decode L LC coefficients (feedback); Reconstruct channel or precoder; | Receive and decode subset selection of L basis vectors; Receive and decode L LC coefficients (feedback); Reconstruct channel or precoder; |

Method 1 is suitable when UL/DL channel reciprocity associated with long-term channel statistics (e.g., such as profile(s) for angles of departure) is reliable; for example UL/DL duplex distance is small, and UE mobility is small. When the UE-specific basis vectors are configured by RRC, one drawback is the RRC configuration delay, which can be in the order of 100 msec; this delay makes it difficult for this method to be able to be used for UEs with medium to high mobility. When the basis vectors are configured via dynamic signaling, one drawback is the control signaling overhead or reliability.

Method 2 is suitable when channel pathloss is high (e.g., for higher carrier frequencies), or when the eNB does not want to incur any signaling overhead neither in UL nor in DL directions. One drawback is some potential increase of CSI-RS overhead when the number of active UEs served by the eNB is sufficiently large. Therefore, this scheme is especially suitable for cells with low loading. Similar to method 1, method 2 is suitable when UL/DL channel reciprocity associated with long-term channel statistics is reliable.

Method 3 is suitable when UL/DL channel reciprocity is weak. Hence this is suitable when the UL-DL duplex distance is sufficiently large. This is especially relevant when higher carrier frequencies are used in conjunction with legacy (lower) carrier frequencies. For instance, the network can configure a DL carrier frequency in mmWave region while its associated (pair) UL carrier in PCS bands. One drawback is the additional feedback overhead incurred by the need for feeding back a UE recommendation of the basis vectors.

Clearly, there are pros and cons of these methods: hence eNB controller can take these tradeoffs into account, to make a decision on which method to use for DL link adaptation, scheduling and precoding. The above use cases are merely exemplary. In real deployment scenarios, many other factors can be considered in devising a set of switching criteria.

In some cases of the above, eNB is capable of supporting multiple carrier frequency bands and carrier frequency is used as selection criteria. Here the multiple carrier frequencies can be at least one frequency in low band (up to 6 GHz), at least one frequency in middle band (6 GHz to 60 GHz) and at least one frequency in high band (more than 60 GHz). In one example, "Basis vector selection" block selects either method 1 or 3 (estimated or feedback basis vectors) if carrier frequency is below a certain carrier frequency, e.g., 6 GHz or 30 GHz; otherwise the block selects method 2 (precoded CSI-RS weights). In another example, "Basis vector selection" block selects either method 1 (estimated basis vectors) if carrier frequency is above a certain carrier frequency, e.g., 6 GHz; otherwise the block selects method 2 or 3 (feedback basis vectors or precoded CSI-RS weights).

In other cases of the above, eNB is capable of supporting multiple duplex schemes and a number of serving cells in different carrier frequency bands. In this case, a type of duplex scheme is used as selection criteria. For example, "Basis vector selection" block selects either method 1 (estimated basis vectors) for a serving cell if the serving cell is time-division-duplex (TDD); the block selects Method 3 (feedback basis vectors) if the serving cell is frequency-division duplex (FDD).

In some embodiments, eNB explicitly configures method(s) to be used for its basis vector selection to UE, via higher-layer (e.g., RRC) signaling.

Figure 8:
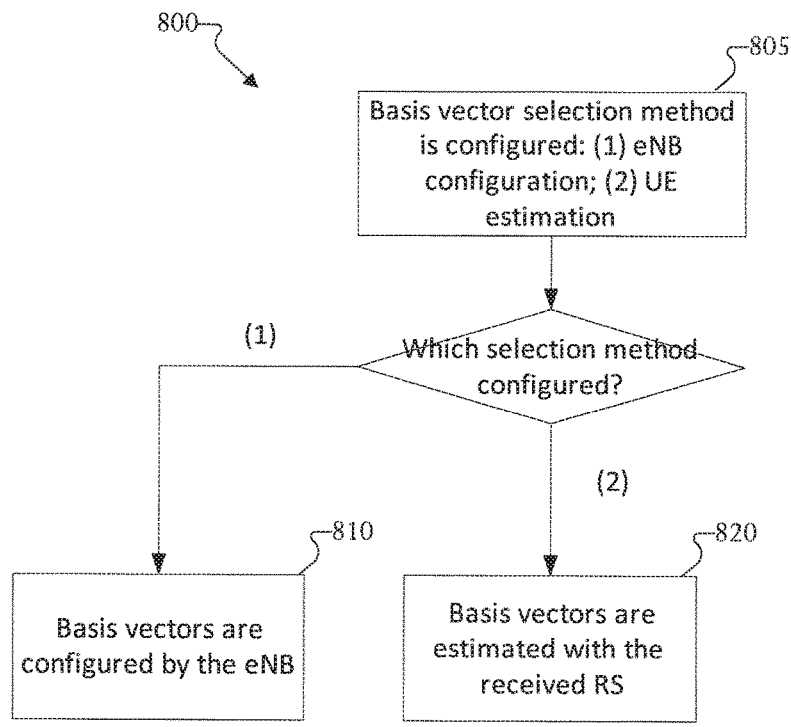
FIG. 8 is a process for UE's basis vector configuration according to this disclosure.

FIG. 8 is a process 800 for UE's basis vector configuration according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry in, for example, a mobile station.

A UE is capable of configuring one basis vector selection method out of multiple. In operation 805, the UE is configured by eNB how to select basis vectors: (1) eNB configuration; and (2) UE estimation. When (1) eNB is configured, the UE configures the basis vectors based upon the eNB's basis vector configuration information in operation 810; when (2) UE estimation is configured, the UE estimates the basis vectors utilizing the received RS, i.e., CSI-RS or CRS in operation 820.

In some embodiments, a UE is capable of supporting at least one of multiple duplex schemes, multiple carrier frequency bands and a number of serving cells in different carrier frequency bands. The UE is further capable of selecting one basis vector selection method out of multiple according to FIG. 8.

Then, the UE can use carrier frequency for configuring the basis vector selection method.

In one example, the UE is configured with (a) eNB configured basis vectors for a serving cell with carrier frequency is above a threshold carrier frequency, e.g., 6 GHz; on the other hand, the UE is configured with (b) UE estimated basis vectors for a serving cell with the carrier frequency is below the threshold carrier frequency.

Alternatively, the UE can use a type of duplex scheme for configuring the basis vector selection method.

In one example, the UE is configured with (1) eNB configured basis vectors for a TDD serving cell; alternatively, the UE is configured with (2) UE estimated basis vectors for an FDD serving cell.

In some embodiments, if the UE is capable of higher rank transmissions (e.g. rank 2), then the basis vector selection block can output "rank" number of sets of basis vectors and the CSI reconstruction block can receive the "rank" number of sets of channel coefficients for the channel state reconstruction.

Figure 9:
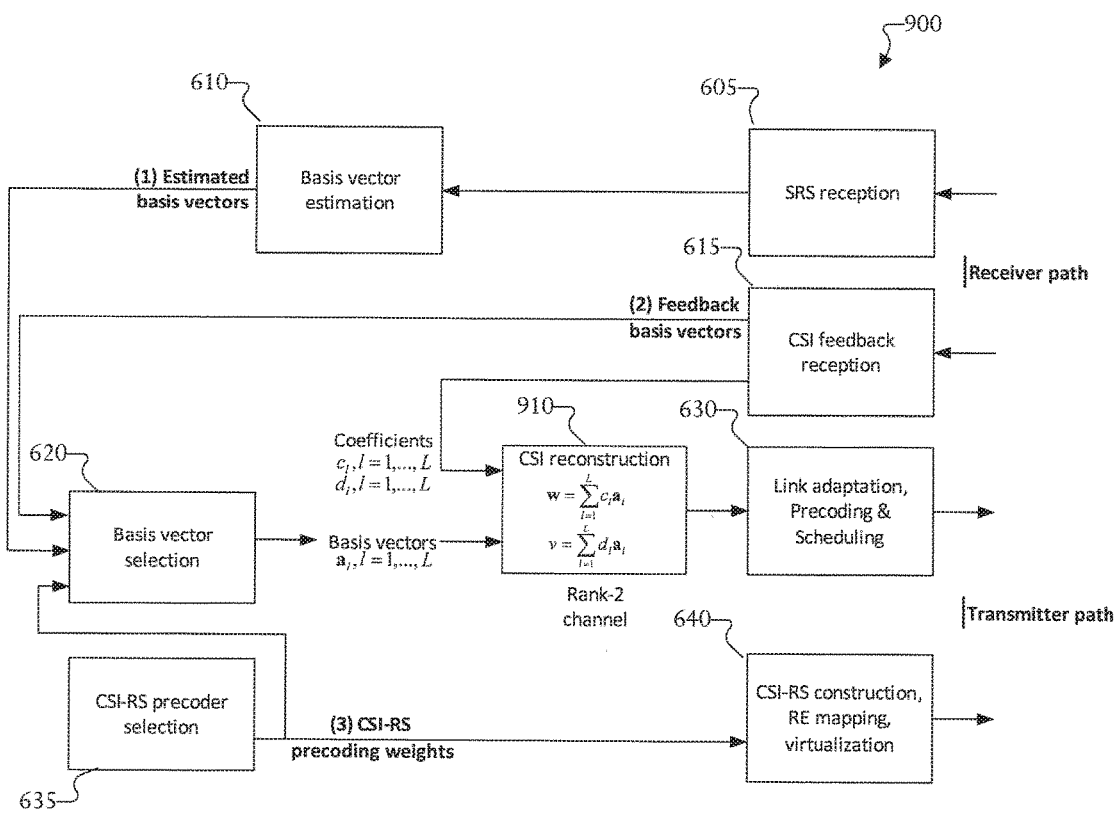
FIG. 9 illustrates an overall BS precoding operation for a rank 2 channel according to this disclosure.

FIG. 9 illustrates an overall BS precoding operation 900 for a rank 2 channel according to embodiments of the present disclosure. The embodiment shown in FIG. 9 is for illustration only. Other embodiments could be used without departing from the scope of the present disclosure.

In one exemplary illustration, as shown in FIG. 9, the basis vector selection block 620 outputs one set of basis vectors, $a_l$, i=1, 2, . . . , L, and the CSI reconstruction block 910 receives two sets of channel coefficients, $c_l$, l=1, 2, . . . , L, and $d_l$, l=1, 2, . . . , L, from a rank-2 UE for the channel state reconstruction. The CSI reconstruction block reconstructs the rank-2 channel as $[w,v]=[\Sigma_{l=1}^{L} c_l a_l, \Sigma_{l=1}^{L} d_l a_l]$.

Figure 10:
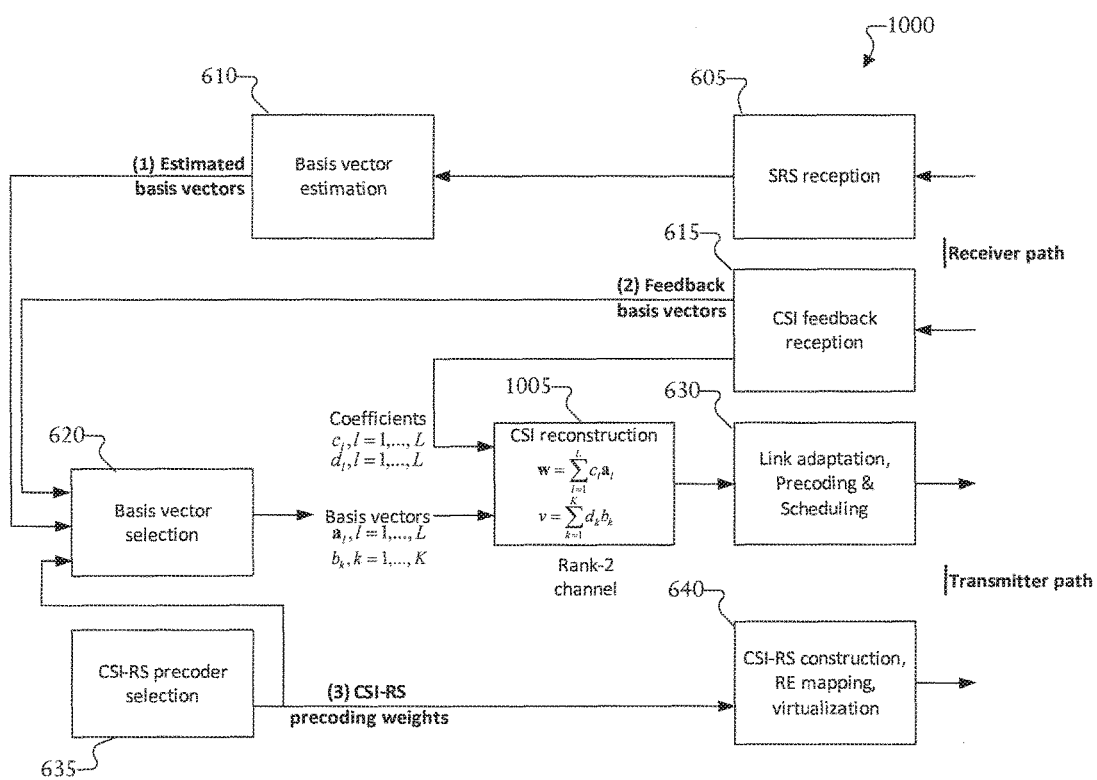
FIG. 10 illustrates another overall BS precoding operation for a rank 2 channel according to this disclosure.

FIG. 10 illustrates another overall BS precoding operation 1000 for a rank 2 channel according to embodiments of the present disclosure. The embodiment shown in FIG. 10 is for illustration only. Other embodiments could be used without departing from the scope of the present disclosure.

In another exemplary illustration as shown in FIG. 10, the basis vector selection block 620 outputs two sets of basis vectors, $a_l$, l=1, 2, . . . , L, and $b_k$, k=1, 2, . . . , K, where =K and L may not be the same, and the CSI reconstruction block 1005 receives two sets of channel coefficients, $c_l$, l=1, 2, . . . , L, and $d_k$, k=1, 2, . . . , K, from a rank-2 UE for the channel state reconstruction. The CSI reconstruction block reconstructs the rank-2 channel as $[w,v]=[\Sigma_{l=1}^{L} c_l a_l, \Sigma_{k=1}^{K} d_k b_k]$.

Figure 11:
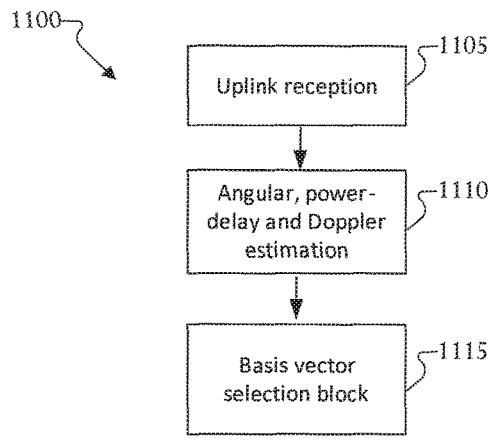
FIG. 11 illustrates a flowchart for the basis vector selection according to this disclosure.

FIG. 11 illustrates a flowchart 1100 for the basis vector selection according to embodiments of the present disclosure. The embodiment shown in FIG. 11 is for illustration only. Other embodiments could be used without departing from the scope of the present disclosure.

The eNB receive uplink signals at operation 1105 and selects one method out of the above three methods based on uplink measurement such as SRS or PUSCH at operation 1100. The uplink measurement includes angular, power-delay and Doppler estimation. The operation of the basis vector selection block 1115 is described below in detail.

Figure 12:
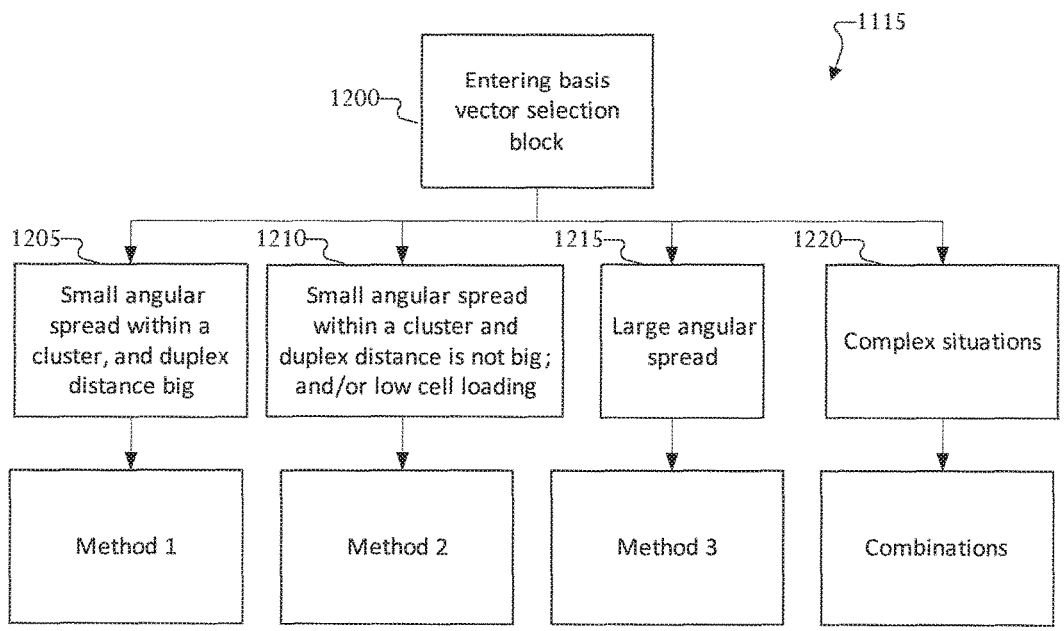
FIG. 12 illustrates an example switching criteria for the basis vector selection block according to this disclosure.

FIG. 12 illustrates an example switching criteria for the basis vector selection block 1115 according to some embodiments of the present disclosure. The embodiment shown in FIG. 12 is for illustration only. Other embodiments could be used without departing from the scope of the present disclosure.

The basis vector selection block 1115 switches between Methods 1 to 3, and their combinations according to the criteria. Upon measuring uplink channel characteristics, the eNB controller checks how large cluster angular spread is in operation 1200: if it is large, the block chooses Method 3 in operation 1215; and if it is small, then the eNB further checks whether duplex distance is big or small. If duplex distance is big, the block chooses Method 1 in operation 1205; if it is small, the basis vector selection block 1115 chooses Method 2 in operation 1210. In complex situations, eNB can choose a combination of these three methods in operation 1220. In these embodiments, in order the eNB to determine "small" or "large", eNB can set a threshold value to compare. For example, if the cluster angular spread is greater than the threshold value, the basis vector selection block 1115 can choose Method 3.

These embodiments are motivated by the following observations.

In Method 1, the eNB can configure a set of L basis vectors for UE. This set can be derived from uplink reception as well as feedback. In order for such approach to work well, it is needed that the angular spread of the channel per cluster is not significantly high, otherwise it is difficult to capture power effectively.

In Method 2, W1 (or set of L basis vectors) is not explicitly configured by eNB; instead it precodes CSI-RS based on uplink measurement. It can require the uplink measurement to reflect downlink channel well. This is true when the duplex distance between uplink and downlink is not that large so that the angles of multipaths are similar in uplink and downlink. In addition, it can require the angular spread within a cluster (not distinguishable in time domain) is small otherwise there would not be a dominant direction that can be extracted from the uplink measurement.

In Method 3, as the eNB reconstructs the channel primarily on UE feedback so it does not matter too much of the channel angular spread. It is also possible to use a combination of Method 1, 2 and 3.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed:

1. A mobile station, comprising:
a plurality of antenna ports selectively configured to receive channel state information reference signals (CSI-RSs); and
a processor configured to:
determine, based on a number L configured by higher-layer signaling, a set of L vectors $a_l$, {l=1,2, . . . , L} to be used for reporting channel state information (CSI) based on the CSI-RSs, wherein the set of L vectors $a_l$ is selected from a superset of vectors, and utilize the determined set of L vectors $a_l$ with quantization coefficients $c_l$ having amplitude components and phase components that are separately quantized in generating a CSI report based on the CSI-RSs.

2. The mobile station according to claim 1, wherein the quantization coefficients $c_l$ are utilized to construct a linear combination of the determined set of L vectors $a_l$.

3. The mobile station according to claim 2, wherein the linear combination is constructed by $$w = \sum_{l=1}^{L} c_l a_l.$$

4. The mobile station according to claim 1, wherein the processor is configured to receive a CSI-RS configuration for the plurality of antenna ports on which the CSI-RSs will be received.

5. The mobile station according to claim 4, wherein the CSI report corresponds to codebook elements within one of a plurality of codebook subsets from a codebook for CSI reporting, and wherein the codebook elements are mapped to a plurality of amplitude coefficient component indicators and at least one phase coefficient indicator.

6. The mobile station according to claim 5, wherein the codebook subsets comprise at least a first codebook subset corresponding to a first number of layers on which the plurality of antenna ports is configured by the CSI-RS configuration to receive the CSI-RSs and a second codebook subset corresponding to a second number of the layers.

7. The mobile station according to claim 5, wherein, based on reliability of uplink/downlink channel reciprocity and channel pathloss, the CSI report is based on a full set of the plurality of amplitude coefficient indicators and the at least one phase coefficient indicator and one of with precoding of the CSI-RSs or without precoding of the CSI-RSs.

8. The mobile station according to claim 5, wherein, based on reliability of uplink/downlink channel reciprocity and channel pathloss, the CSI report is based on a subset of the plurality of amplitude coefficient indicators and the at least one phase coefficient indicator.

9. A method, comprising:
receiving channel state information reference signals (CSI-RSs) using a plurality of antenna ports selectively configured to receive the CSI-RSs;
determining, based on a number L configured by higher-layer signaling, a set of L vectors $a_l$, $\{l=1, 2, \ldots, L\}$ to be used for reporting channel state information (CSI) based on the CSI-RSs, wherein the set of L vectors $a_l$ is selected from a superset of vectors; and
utilizing the determined set of L vectors $a_l$ with quantization coefficients $c_l$ having amplitude components and phase components that are separately quantized in generating a CSI report based on the CSI-RSs.

10. The method according to claim 9, wherein the quantization coefficients $c_l$ are utilized to construct a linear combination of the determined set of L vectors $a_l$.

11. The method according to claim 10, wherein the linear combination is constructed by $$w = \sum_{l=1}^{L} c_l a_l.$$

12. The method according to claim 9, further comprising:
receiving a CSI-RS configuration for the plurality of antenna ports on which the CSI-RSs will be received.

13. The method according to claim 12, wherein the CSI report corresponds to codebook elements within one of a plurality of codebook subsets from a codebook for CSI reporting, and wherein the codebook elements are mapped to a plurality of amplitude coefficient component indicators and at least one phase coefficient indicator.

14. The method according to claim 13, wherein the codebook subsets comprise at least a first codebook subset corresponding to a first number of layers on which the plurality of antenna ports is configured by the CSI-RS configuration to receive the CSI-RSs and a second codebook subset corresponding to a second number of the layers.

15. The method according to claim 13, wherein, based on reliability of uplink/downlink channel reciprocity and channel pathloss, the CSI report is based on a full set of the plurality of amplitude coefficient indicators and the at least one phase coefficient indicator and one of with precoding of the CSI-RSs or without precoding of the CSI-RSs.

16. The method according to claim 13, wherein, based on reliability of uplink/downlink channel reciprocity and channel pathloss, the CSI report is based on a subset of the plurality of amplitude coefficient indicators and the at least one phase coefficient indicator.

17. A base station, comprising:
a plurality of antenna ports selectively configured to transmit channel state information reference signals (CSI-RSs); and
a processor configured to:
determine, based on a number L configured by higher-layer signaling, a set of L vectors $a_l$, $\{l=1,2, \ldots, L\}$ used for reporting channel state information (CSI) based on the CSI-RSs, wherein the set of L vectors $a_l$ is selected from a superset of vectors, and
utilize the determined set of L vectors $a_l$ with quantization coefficients $c_l$ having amplitude components and phase components that are separately quantized in processing a CSI report based on the CSI-RSs.

18. The base station according to claim 17, wherein the quantization coefficients $c_l$ are utilized to construct a linear combination of the determined set of L vectors $a_l$.

19. The base station according to claim 18, wherein the linear combination is constructed by $$w = \sum_{l=1}^{L} c_l a_l.$$

20. The base station according to claim 17, wherein the plurality of antenna ports includes 2N antenna ports for antenna elements in each row of a two-dimensional, rectangular array of antenna elements at the base station and M antenna ports for antenna elements in each column of the two-dimensional, rectangular array of antenna elements, and wherein the processor is configured to transmit a CSI-RS configuration for the plurality of antenna ports on which the CSI-RSs will be transmitted.

21. The base station according to Claim 20, wherein the CSI report corresponds to codebook elements within one of a plurality of codebook subsets from a codebook for CSI reporting, and wherein the codebook elements are mapped to a plurality of amplitude coefficient component indicators and at least one phase coefficient indicator.

22. The base station according to claim 21, wherein the codebook subsets comprise at least a first codebook subset corresponding to a first number of layers on which the plurality of antenna ports is configured by the CSI-RS configuration to receive the CSI-RSs and a second codebook subset corresponding to a second number of the layers.

23. The base station according to claim 21, wherein, based on reliability of uplink/downlink channel reciprocity and channel pathloss, the CSI report is based on a full set of the plurality of amplitude coefficient indicators and the at least one phase coefficient indicator and one of without precoding of the CSI-RSs or without precoding of the CSI-RSs.

24. The base station according to claim 21, wherein, based on reliability of uplink/downlink channel reciprocity and channel pathloss, the CSI report is based on a subset of the plurality of amplitude coefficient indicators and the at least one phase coefficient indicator.

* * * * *

UNITED STATES PATENT AND TRADEMARK OFFICE
CERTIFICATE OF CORRECTION

| | |
|---|---|
| PATENT NO. | : 10,917,523 B2 |
| APPLICATION NO. | : 15/818331 |
| DATED | : February 9, 2021 |
| INVENTOR(S) | : Young-Han Nam et al. |

It is certified that error appears in the above-identified patent and that said Letters Patent is hereby corrected as shown below:

On the Title Page

Item (63), Line 2, "Oct. 5, 2015" should read --Oct. 2, 2015--.

Signed and Sealed this
Twenty-sixth Day of April, 2022

Katherine Kelly Vidal
*Director of the United States Patent and Trademark Office*